(12) United States Patent
Adachi et al.

(10) Patent No.: US 6,286,387 B1
(45) Date of Patent: Sep. 11, 2001

(54) THREE-DIMENSIONAL INPUT MANIPULATOR

(75) Inventors: Yoshitaka Adachi; Takahiro Kumano; Akio Ikemoto, all of Hamamatsu (JP)

(73) Assignee: Suzuki Motor Corporation, Shizuoka (JP)

( * ) Notice: Subject to any disclaimer, the term of this patent is extended or adjusted under 35 U.S.C. 154(b) by 0 days.

(21) Appl. No.: 09/514,647

(22) Filed: Feb. 29, 2000

(30) Foreign Application Priority Data

Mar. 3, 1999 (JP) ................................... 11-055728
Mar. 3, 1999 (JP) ................................... 11-055729

(51) Int. Cl.[7] .................................................. G05G 11/00
(52) U.S. Cl. ..................................... 74/490.12; 74/490.03; 901/23; 901/9
(58) Field of Search .......................... 74/490.01, 490.03, 74/490.11, 490.12; 901/10, 16, 23, 9

(56) References Cited

U.S. PATENT DOCUMENTS 3,727,119 * 4/1973 Stanley ................................ 318/568
5,807,377 * 9/1998 Madhani et al. ....................... 606/1
6,127,792 * 10/2000 Kamiya et al. ...................... 318/432
6,216,056 * 4/2001 Ito et al. .............................. 700/157

* cited by examiner

Primary Examiner—David Fenstermacher
(74) Attorney, Agent, or Firm—Greenblum & Bernstein, P.L.C.

(57) ABSTRACT

A three-dimensional manipulator comprising: a single operation grip 11 which is moved to an arbitrary position within a definite range of three-dimensional space and inputs current coordinates; a first operation input 2 for holding the operation grip 11 with at least five degrees of freedom; a second operation input 2A for holding the operation grip 11 with at least six degrees of freedom; and grip displacement amount detection mechanism 5 for detecting a change of position and direction of the operation grip 11. The operation grip 11 is formed in a bar shape whose one end serves as a grip portion 111 and whose other end is held by the first and the second operation inputs 2, 2A at two positions.

15 Claims, 18 Drawing Sheets

THREE-DIMENSIONAL INPUT MANIPULATOR

BACKGROUND OF THE INVENTION

1. Field of the Invention

The present invention relates to a three-dimensional input manipulator for use in a data input into an upper node apparatus such as a computer and for simulation using such an upper node apparatus.

2. Description of the Related Art

FIG. 18 schematically shows a conventional three-dimensional input manipulator 1100. For example, when three-dimensionally moving a virtual pointer of a virtual person's finger tip, this three-dimensional input manipulator 1100 is used for inputting a positional information of this virtual pointer.

This three-dimensional input manipulator 1100 includes: a single bar-shaped operation grip 1110 which is manually moved to any position within a predetermined work area and performs input; first operation input means 1120 for supporting one (first) end of this operation grip 1110 with 6 degrees of freedom; second operation input means 1130 for supporting the other (second) end of the operation grip 1110 with 6 degrees of freedom; and grip displacement detection means (not depicted) for detecting changes in position and direction of the operation grip 1110.

Each of the operation input means 1120, 1130 has a plurality of link members and 6 revolute joints for rotatably connecting these link members. With this configuration, the operation grip 1110 has 6 degrees of freedom (positional change and state change of the operation grip 1110).

A state change of the operation grip 1110 is detected by grip displacement amount detection means which detects a rotation angle change for each of the revolute joints generated when the operation grip 1110 is moved or changed in direction and the detected values are used for overall calculations.

In the aforementioned conventional example, however, at least one of the operation input means should have a large movable range, which in turn requires a large size of the apparatus. This is caused by the fact that in this conventional three-dimensional input manipulator, as has been described above, the both ends of the bar-shaped operation grip are supported by the two operation input means.

That is, when operating the bar-shaped operation grip, the operator grasps the intermediate portion of the operation grip and moves one end (a first end) of the operation grip toward a target position or changes the inclination angle of the operation grip. When a state change (inclination angle change) of the operation grip is entered, positional change occurs at one end around the other end or at both ends around the grasped portion of the operation grip.

Here, for one end of the operation grip, the other end moves along the spherical surface having a radius equal to the length of the operation grip. Accordingly, at least one of the operation input means should have an end portion enabling to obtain such a movement. As a result, the operation input means should have a large size.

Moreover, in order to enlarge the movable range of the operation grip, the link members should be designed to be larger, which increases the weight of the link members. The weight of the operation input means itself generates a greater inertia, which decreases the operationability and makes it difficult to perform an accurate positioning. This increases the load on the operator.

SUMMARY OF THE INVENTION

It is therefore an object of the present invention to provide a three-dimensional input manipulator capable of solving the aforementioned problem so as to obtain a small-size manipulator.

The three-dimensional input manipulator claimed in Claim 1 is connected to an upper node apparatus and performs input of coordinates of at least three dimensions, the manipulator comprising: a single operation grip displaced to an arbitrary position within a definite range of three-dimensional space and performing input of coordinates of a current position of the grip; first operation input means for supporting the operation grip with at least five degrees of freedom for changing a state of the operation grip; second operation input means for supporting the operation grip with at least six degrees of freedom for changing a state of the operation grip; grip displacement amount detection means for detecting a position and a direction of the operation grip.

The operation grip is formed to have a bar shape having one end (first end) serving as a grip portion for applying an external force; and the first operation input means and the second operation input means hold the operation grip at the other end (second end) of the operation grip and at a point in the vicinity of the second end.

The operator grasps the operation grip and moves the operation grip in various directions. Here, the first operation input means has at least five degrees of freedom and the second operation input means has at least six degrees of freedom. Accordingly, the operation grip can be moved with at least five degrees of freedom. Thus, the operation grip can be displaced in a three-dimensional space and inclined in any direction.

When the operation grip is moved, the displacement amount is detected by the grip displacement amount detection means, which outputs a detection signal according to the displacement amount, to an upper node apparatus. According to this detection signal, the upper node apparatus calculates three-dimensional position coordinates as input position coordinate data.

Here, the operation grip is held by the two operation input means at two points near the second end, and when the operation grip is displaced or inclined, the relative movement between the two points is performed within a sphere having a diameter equal to the distance between the two points.

Here, it is preferable that the grip portion constitute half or more than half of the longitudinal length of the operation grip (Claim 2). In this case, the relative movement between the aforementioned two points is performed within a sphere having a diameter which is smaller than the half length of the operation grip.

Moreover, both of the operation input means may hold the operation grip with six degrees of freedom (Claim 3). In this case, for example, the operation grip can be displaced in a three-dimensional space, inclined in the longitudinal direction, and rotated around the longitudinal direction.

In the three-dimensional input manipulator claimed in Claim 4, each of the operation input means has: an input position support mechanism for supporting the operation grip at an arbitrary position of the three-dimensional space; and a state variable support mechanism for supporting the operation grip in such a manner that a direction of the operation grip can be changed.

Furthermore, each of the operation input means may have an identical number of revolute joints to the plurality of degrees of freedom (Claim 5). In this case, the revolute joint may be a reciprocal type in which a rotation axis is vertical to the rotation plane defined by two members, or a rotary type in which a rotation axis is parallel to (is matched with) the line defined by two members. The revolute joint also may be a joint in which a member is displaced in relation to the other member along a predetermined line. It is preferable to employ these revolute joints in combination for realizing a state change with the respective degrees of freedom.

Moreover, each of the input position support mechanisms of the operation input means has three degrees of freedom, and each of the state variable support mechanisms of the operation input means has three degrees of freedom for supporting the operation grip (Claim 7).

This enables to displace the support end to any position in a three-dimensional space and change the state of the operation grip (inclination and rotation).

The input position support mechanism and the state variable support mechanism of the operation input means have three revolute joints, respectively, and the grip displacement amount detection means includes six sensors for detecting the state change amount of all the revolute joints of the input position support mechanisms (Claim 8).

That is, each of the two operation input means has three revolute joints, and with cooperation of these revolute joints, the support end is positioned at any position within a three-dimensional space. Since each of the revolute joints has a sensor, any position entered by the two operation input means can be identified by the sensor outputs. Thus, the positions of the support ends of the first and the second operation input means are identified, and from these positions, it is possible to identify the state (inclination) of the operation grip.

The manipulator may have a base for holding the two operation input means (Claim 9). Each of the operation input means has one end (first end) for supporting the operation grip and the other end (second end) having a revolute joint. Each of the operation input means is connected to the base via a rotary shaft of the revolute joint at the second end, and the rotary shafts are placed in a vertical direction when the base is placed on a horizontal plane.

It is assumed that the base is placed on a horizontal plane. In this case, the rotary shafts of the revolute joint of the two operation input means on the base are positioned perpendicular. Each of the rotary shafts supports the total weight of the operation input means. Since the rotary shafts are perpendicular, the load by the weight of the operation input means is almost entirely a compression or tensile load. The strength of shaft in this direction is normally greater than a bending load as in the conventional example and the affect by the weight of the operation input means can be reduced.

The manipulator claimed in Claim 10 comprises a plurality of drive force generation means for applying to the operation grip a drive force corresponding to an output from the upper node apparatus, in a corresponding direction.

With the aforementioned configuration, a current position of the operation grip displaced by the operator is output as a three-dimensional input position coordinate data to an upper node apparatus. Upon reception of this data, the upper node apparatus calculates a reaction force data corresponding to the input position coordinate data and outputs the result to the three-dimensional input manipulator. The drive force generation means operates to generate a reaction force corresponding to the reaction force data (for example, a force in the opposite direction to the displacement direction applied to the operation grip by the operator). Thus, the operator feels a reaction force or resistance force against the operation grip.

The three-dimensional input manipulator claimed in Claim 11 comprises three drive force generation means for applying to the operation grip a drive force corresponding to the output from the upper node apparatus in the direction according to the degree of freedom of each input position support mechanism.

With the aforementioned configuration, like in the invention of Claim 10, a drive force (for example, virtual reaction force) corresponding to an input position of the operation grip is applied to the operation grip. Here, the drive force is applied to move the holding points held by the first and the second operation input means, respectively. Accordingly, the drive force is applied not only to a definite direction movement of the operation grip but also to inclination of the operation grip.

The three-dimensional input manipulator claimed in Claim 12 is connected to an upper node apparatus and performs input of three-dimensional coordinates, the manipulator comprising: a single operation grip displaced to an arbitrary position within a definite range of three-dimensional space and performing input of coordinates; first operation input means for holding this operation grip with at least five degrees of freedom; second operation input means for holding this operation grip with at least six degrees of freedom; grip displacement amount detection means for detecting a position and direction of the operation grip; a displacement urging mechanism for holding the two operation input means with a plurality of degrees of freedom and conveying the operation input means in a three-dimensional space; holding position displacement detection means for detecting a position and direction of the two operation input means from the displacement urging mechanism; and control means for controlling operations of the respective components.

The operation grip is formed to have a bar shape whose one end (first end) serves as a grip portion for applying an external force. The first operation input means and the second operation input means holds the grip at the other end (second end) of the operation grip and in the vicinity of the second end.

The control means includes: an input coordinate calculator for calculating an input position coordinate data and a state data of the operation grip according to the output from the grip displacement amount detection means and the holding position displacement amount detection means; a holding position calculator for calculating the destination of the first and the second operation input means according to the input position coordinate data of the operation grip; and a work space extender for controlling the operation of the displacement urging mechanism to convey the two operation input means to the destination determined.

With the aforementioned configuration, the operator grasps the operation grip and moves the operation grip in an arbitrary direction. The operation grip can be moved in any way according to the degrees of freedom of the operation input means.

Moreover, the operation grip is divided into a grip portion to be grasped by the operator at one end and a support portion supported by the two operation input means at the other end. When the operation grip is conveyed to another position or inclined in an arbitrary direction, the relative movement between the first and the second operation input means is within a sphere having a radius equal to the distance between the grip support positions.

When the grip is moved, the support position displacement amount detection means and the grip displacement amount detection means output detection signals to the input calculator.

According to these detection signals, the input coordinate calculator calculates an input position coordinate data and a state data of the operation grip. If the calculated position coordinate data exceeds a predetermined threshold value, a destination of the operation grip is determined. The work space extender makes the displacement urging mechanism operate to move the operation input means to the destination.

In the three-dimensional input manipulator claimed in Claim 13, each of the operation input means has drive force generation means for generating a displacement of the operation grip, and the control means has a function to maintain the position and state of the operation grip when the displacement urging mechanism is operated.

When the two operation input means are conveyed by the displacement urging mechanism, the drive force generation means causes a displacement opposite to the convey direction, so that an absolute position of the operation grip is not changed by the convey.

In the three-dimensional input manipulator claimed in Claim 14, the control means has a reaction force generation controller for receiving a reaction force data corresponding to the input position coordinate data and outputting a drive instruction signal according to the reaction force data, to the drive force generation means.

With the aforementioned configuration, a current position of the operation grip moved by the operator is output as a three-dimensional input position coordinate data from the input coordinate calculator to an upper node apparatus. The upper node apparatus calculates a reaction force data corresponding to the input position coordinate data and outputs the reaction force data to the three-dimensional input manipulator. The reaction force generation controller, upon reception of this reaction force data, drives the drive force generation means to generate a reaction force corresponding to the reaction force data (for example, a force in a direction different from the movement applied to the operation grip by the operator). Thus, the operator can feel a reaction force or resistance force in answer to the operation of the operation grip.

Furthermore, it is preferable that the displacement urging mechanism hold the two operation input means with at least six degrees of freedom (Claim 15).

Thus, the operation grip can move to any place in a three-dimensional space and can change its state in any way.

BRIEF DESCRIPTION OF THE DRAWINGS

FIG. 8 shows a cam member of third drive force generation means shown in FIG. 3.

FIG. 17 shows a relationship between a work space of the operation grip and operation of the displacement urging mechanism.

DESCRIPTION OF THE PREFERRED EMBODIMENTS

Embodiment 1

Description will now be directed to an embodiment of the present invention with reference to the attached drawings.

Figure 1:
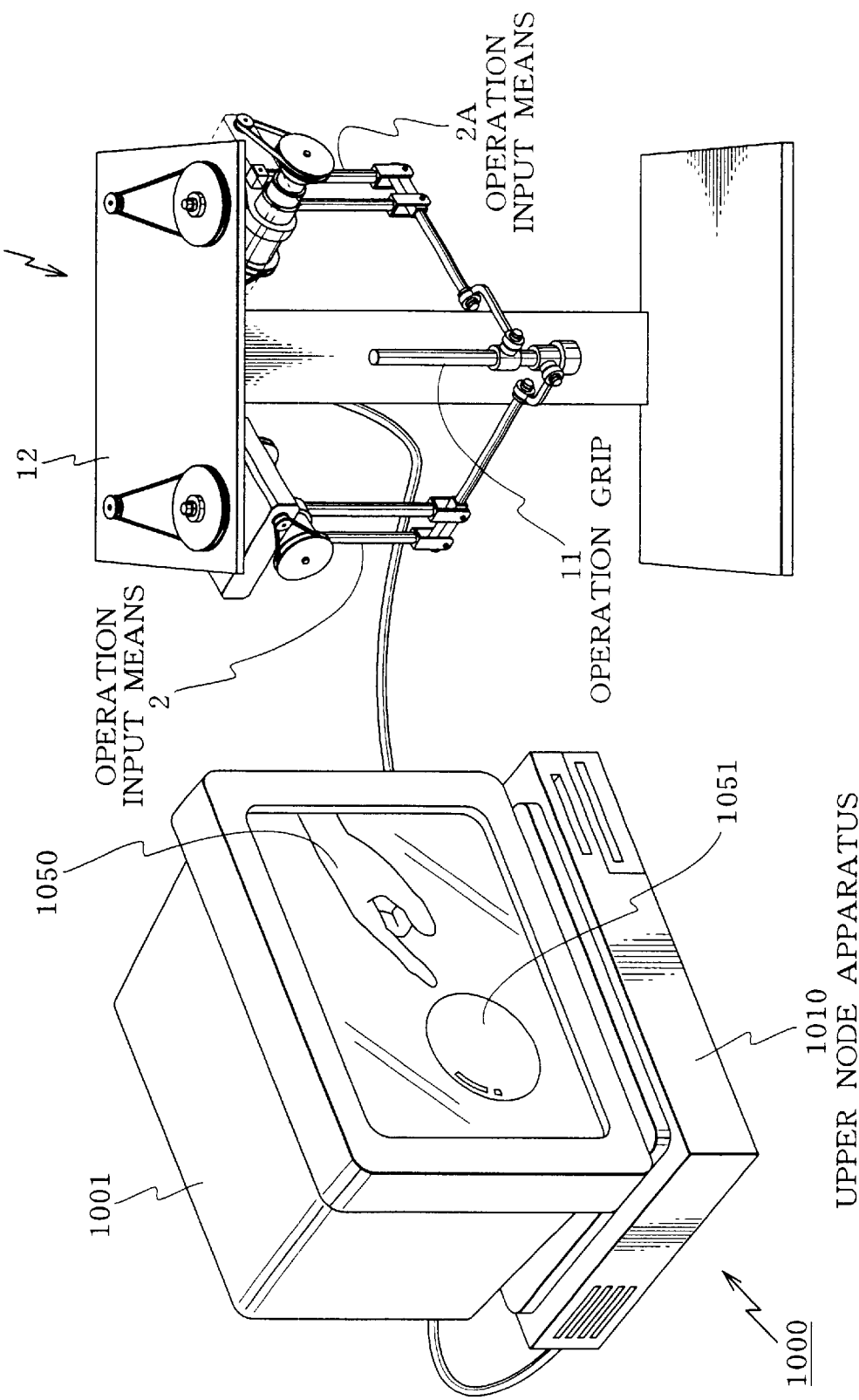
FIG. 1 schematically shows a three-dimensional input system according to a first embodiment of the present invention.

FIG. 1 shows a three-dimensional input system 1000 including a three-dimensional input manipulator 10 for entering three-dimensional coordinates according to the present embodiment.

This three-dimensional input system 1000 includes: the three-dimensional input manipulator 10; a CPU 1010 as a higher node apparatus of this three-dimensional input manipulator; and a display 1001 for displaying an image according to an output data from the CPU 1010.

Figure 2:
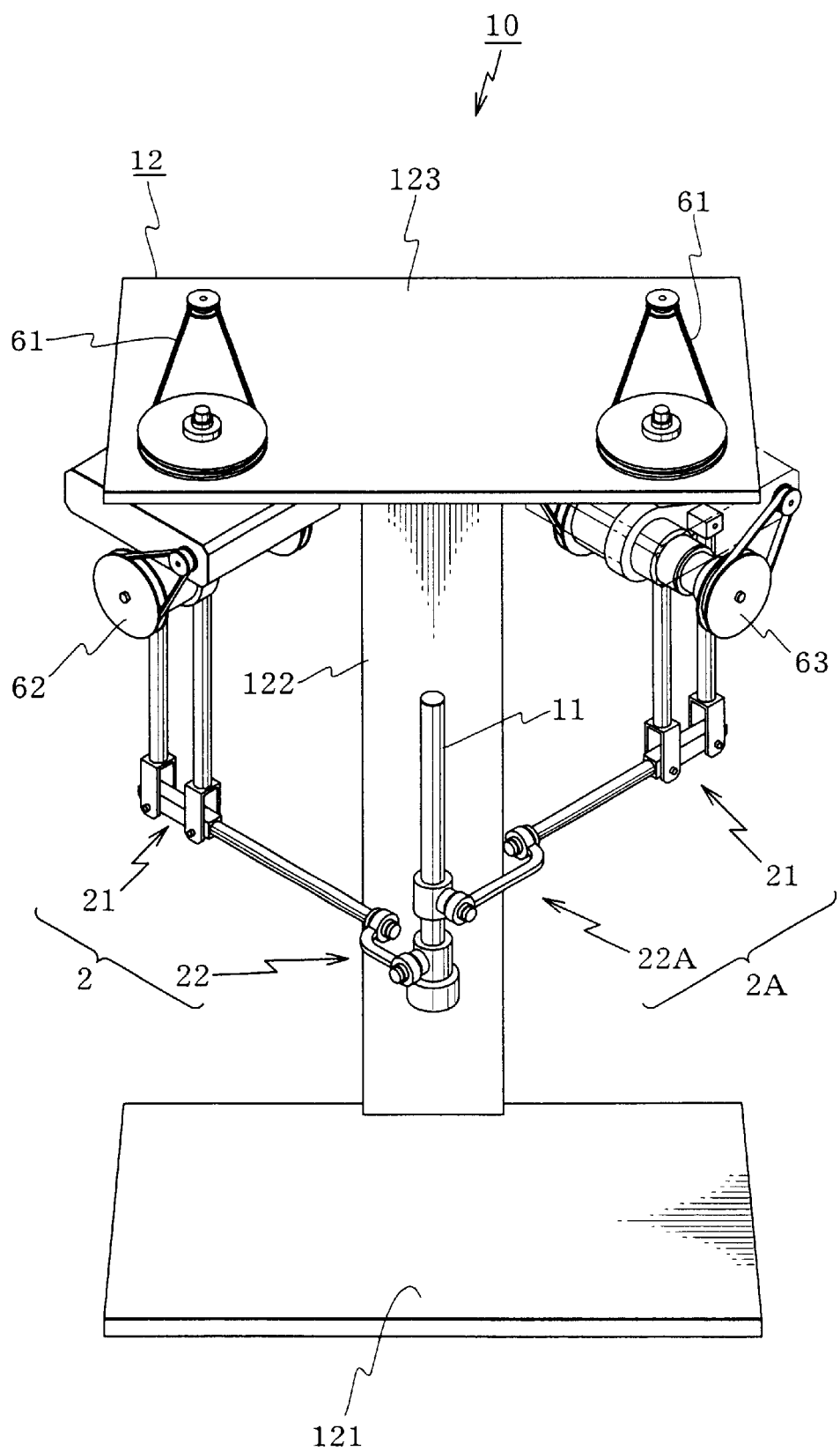
FIG. 2 is a perspective view of the threedimensional input manipulator shown in FIG. 1.

FIG. 2 is a perspective view of the aforementioned three-dimensional input manipulator 10. In this three-dimensional input manipulator 10, a plurality of link members are connected to one another via rotatable revolute joints. An operation grip 11 is arranged at a rotary end of the end link member, thus enabling the operation grip 11 to displace in a plurality of degrees of freedom.

This three-dimensional input manipulator 10 includes: a single operation grip 11 to be displaced to any position within a predetermined three-dimensional space and input a positional data; first operation input means 2 for supporting the operation grip 11 in such a way that 6 degrees of freedom can be obtained; second operation input means 2A for supporting the operation grip 11 in such a way that 6 degrees of freedom can be obtained; a base 12 for simultaneously supporting the first and the second operation input means 2 and 2A; grip displacement amount detection means 5 (not depicted in FIG. 2) for detecting the position and the direction of the operation grip 11; a plurality of drive force generation means 6 (including the drive force generation means 61, 61, 62, 62, 63, 63 which will be detailed later) for urging the operation grip 11 with a drive force according to the output from the CPU 1010 as a virtual reaction force during the operation of the operation grip 11; and control means (not depicted in FIG. 2) for controlling operations of the aforementioned components.

Explanation will be given on each of the components. Firstly, the base 12 consists of a flat bottom plate 121, a support column 122 extending from this flat bottom plate 121, and a flat top plate 123 for supporting the first and the second operation input means 2 and 2A. This base, when viewed from the right side in FIG. 2, has a U-shaped configuration. When the bottom plate 121 is on a horizontal plane, the top plate 123 connected by the support column 122 is also horizontal. The first and the second operation input means 2 and 2A are hung from the lower surface of the top plate.

Next, explanation will be given on the first and the second operation input means, which are almost identical except for that they are arranged at different positions. Like members are denoted by like reference symbols, and redundant explanation will be omitted.

Each of the first and the second operation input means 2 and 2A includes an input position support mechanism 21 for displacably supporting the operation grip 11 at a desired position in the three-dimensional space and a state variable support mechanism 22 for supporting the operation grip 11 at a desired direction. Each of the input position support mechanism 21 and the state variable support mechanism 22 has 3 degrees of freedom.

Furthermore, each of the input position support mechanism 21 and the state variable support mechanism 22 has three revolute joints, each corresponding to a degree of freedom. This enables a state change in 3 degrees of freedom. Each of the six revolute joints of the input position support mechanism 21 of the first operation input means 2 and the second operation input means 2A is provided with an encoder, 51, 51, 52, 52, 53, 53 as a sensor for detecting a state change amount. These six encoders and an encoder 54 which will be detailed later constitute the grip displacement amount detection means 5.

The drive force generation means 6 for generating a drive force for the direction of the state change according to the degrees of freedom of the input position support mechanism 21 is realized by six drive force generation means corresponding to the respective revolute joints of the input position support mechanism 21.

The first and the second operation input means 2 and 2A will be detailed with reference to FIG. 3 to FIG. 5.

Figure 3:
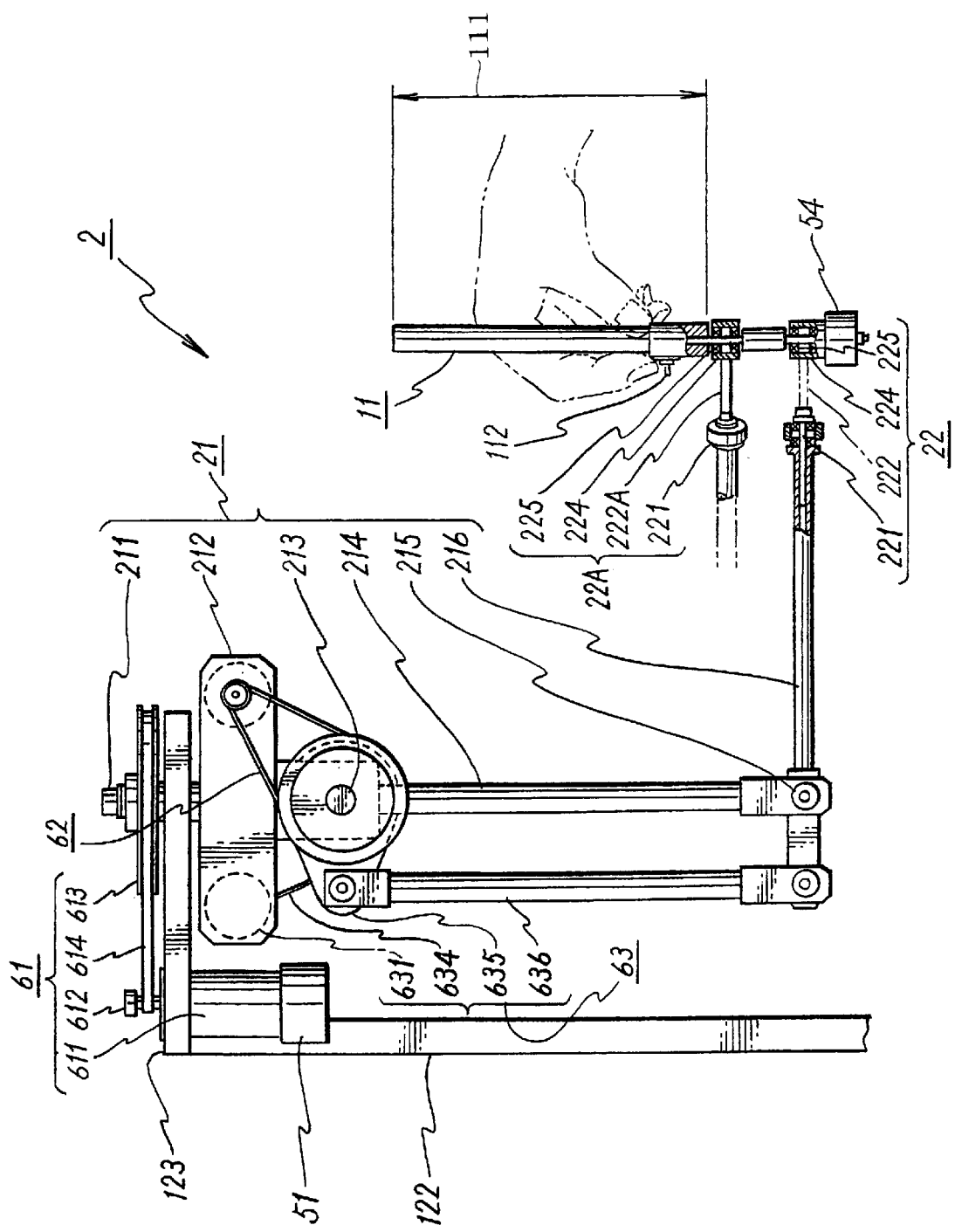
FIG. 3 is a left side view of operation input means of the three-dimensional input manipulator shown in FIG. 2.

FIG. 3 is a left side view of the first operation input means 2 of FIG. 2 rotated by 45 degrees clockwise (the second operation input means 2A is omitted in the figure). Moreover, FIG. 4 is a front view of the first operation input means 2 of FIG. 3 viewed from the right side. FIG. 4 is partially omitted and partially exploded.

The input position support mechanism 21 includes: a first revolute joint 211; a first link member 211 connected to the top plate 123 of the base 12 via the first revolute joint 211; a second revolute joint 213; a second link member 214 connected to the first link member 212 via the second revolute joint 213; a third revolute joint 215; and a third link member 216 connected to the second link member 214 via the third revolute joint 215.

The first revolute joint has a rotary shaft 211a vertically thrusting the top plate 123 and a bearing 211b for supporting the rotary shaft 211a in such a manner that the rotary shaft 211a can rotate against the top plate 123. That is, when the base 21 is horizontally placed, the rotary shaft 211a is perpendicular.

Furthermore, the rotary shaft 211a has its upper end engaged with first drive force generation means 61 which will be detailed later, and its lower end fixedly connected to the first link member 212. Thus, the first link member 212 is arranged so as to rotate together with the rotary shaft 211a around an axis vertical to the top plate 123. It should be noted that the first operation input means 2 (and the second operation input means 2A) is connected to the base 12 only via this rotary shaft 211a.

Figure 5:
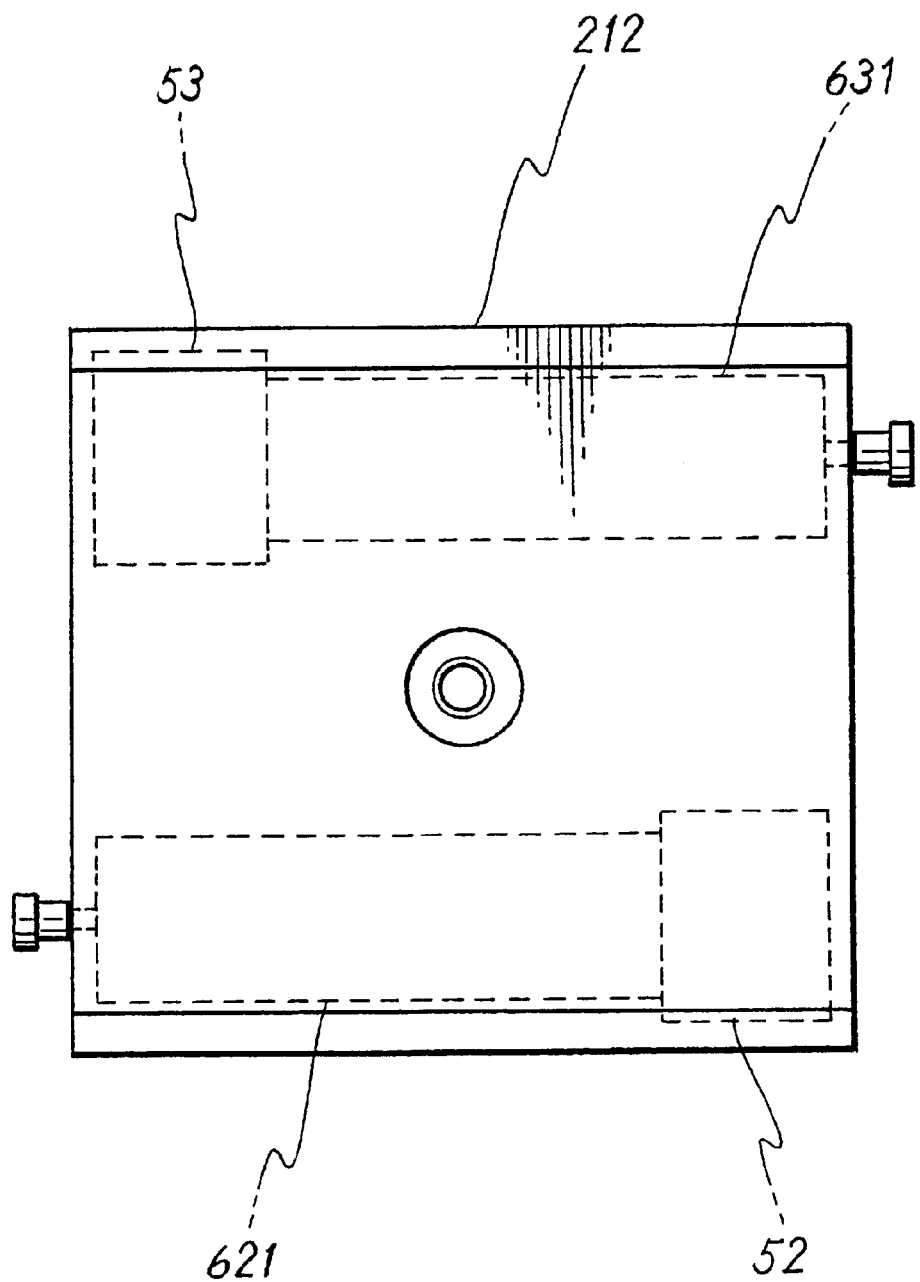
FIG. 5 is a plan view of a first link member of an input position support mechanism of the operation input means shown in FIG. 3.

FIG. 5 is a plan view of the first link member 212. This first link member 212 is a parallelopiped case containing drive motors 621, 631 of the second and third drive force generation means 62, 63 which will be detailed later and encoders 52, 53 as grip displacement amount detection means. The case of the first link member 212 also has a support protrusion 212a on its lower surface for supporting the rotary shaft 213a of the second revolute joint.

The second revolute joint 213 has a rotary shaft 213a horizontally arranged (when the base 12 is placed on a horizontal plane) and thrusting the aforementioned support protrusion 212a, and a bearing 213b for rotatably supporting this rotary shaft 213a.

The second link member 214 has a shape of a longitudinal bar having one (first) end fixedly connected to the rotary shaft 213a of the second revolute joint 213 and the other (second) end connected to the third link member 216 via the third revolute joint 215. Thus, the second end of the second link member 214 can rotate around the first link member 212.

The third revolute joint 215 has a rotary shaft 215a arranged to be parallel to the rotary shaft 213a of the second revolute joint 213 and a bearing 215b for supporting the rotary shaft 215a so as to be rotatable against the second end of the second link member 214.

The third link member 216 is formed as a longitudinal bar, which is fixedly connected at the vicinity of one end (first end) to the rotary shaft 215a of the third revolute joint. Moreover, the third link member 216 has the other end (second end) where the state variable support mechanism 22 is arranged, and supports the operation grip 11 via the state variable support mechanism 22. Accordingly, the third link member 216 can rotate around the rotary shaft 215a of the third revolute joint 215 against the second link member 214. Moreover, the state variable support mechanism 22, with cooperation of the first to the third revolute joints 211, 213, 215, can move to any position in a three-dimensional space with respect to the top plate 123 of the base 112.

Moreover, the first end of the third link member is engaged with third drive generation means 63 which will be detailed later.

Figure 6:
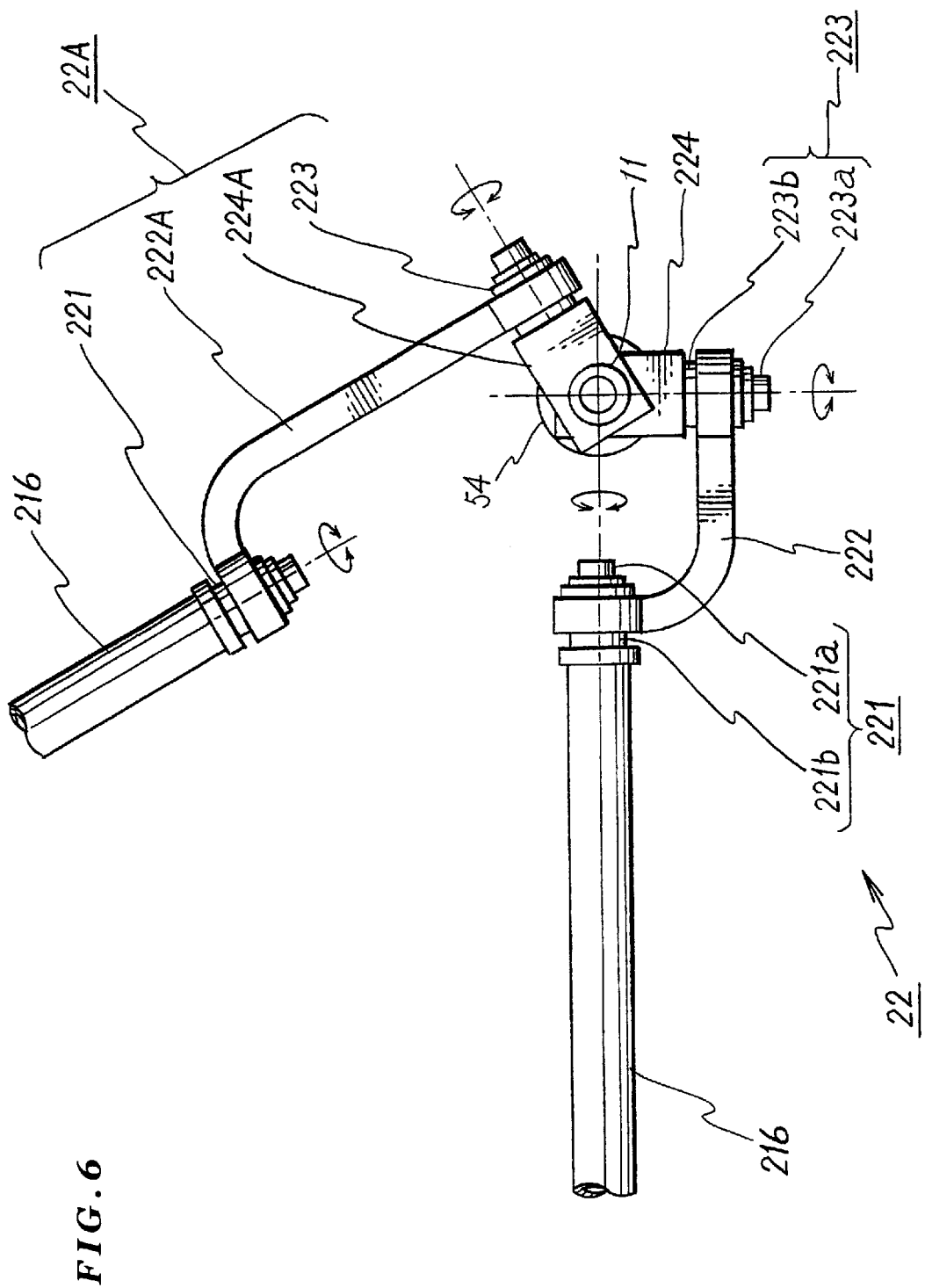
FIG. 6 is a plan view of a state variable support mechanism of the operation input means shown in FIG. 3.

Next, explanation will be given on the state variable support mechanism 22 (22A). FIG. 6 is a top view of the state variable support mechanism 22 (22A) of FIG. 3.

This state variable support mechanism 22 includes a fourth link member 222, a fourth revolute joint 221, a fifth link member 224, a fifth revolute joint 223, a sixth revolute joint 225. Moreover, the state variable support mechanism 22A has an identical configuration.

The fourth link member 222 has one end (first end) connected to the second end of the third link member 216 via the fourth revolute joint 221.

The fifth link member 224 has one end (first end) connected to the second end of the fourth link member 222 via the fifth revolute joint 223.

Furthermore, the fifth link member 224 has the other (second) end connected to the operation grip 11 via the sixth revolute joint 225.

The fourth link member 222 (222A) has a spindle 221a extending from the second end of the third link member 216 in the longitudinal direction of the first link member and a bearing 221b rotatable around this spindle 221a.

The fourth link member 222 (222A) holds at its one end (first end) the bearing 221b and can rotate around an axis of the longitudinal direction of the third link member 216. Furthermore, the other end (second end) of the fourth link member 222 (222A) is connected to the fifth link member 224 (224A) via the fifth revolute joint 223.

It should be noted that the fourth link member 222A of the state variable support mechanism 22A is set longer than the fourth link member 222 of the state variable support mechanism 22.

The fifth revolute joint 223 has a spindle 223a protruding at one end (first end) of the fifth link member 224 (224A) and a bearing 223b rotatable around this spindle 223a. The fourth link member 222 (222A) holds the spindle 223a of the fifth revolute joint 223 and the spindle 221a of the fourth revolute joint 221 in such a manner that extensions of the spindles orthogonally intersect each other.

The fifth link member 224 (224A), at its other end (second end) rotatably holds the operation grip 11 via the bearing constituting the sixth revolute joint 225. The sixth revolute joint 225 is arranged between the fifth link member and the operation grip 11. By this sixth revolute joint, the grip rotates against the fifth link. The operation grip 11 has its rotation center shaft which orthogonally intersects the rotation shafts of the fourth revolute joint 221 and the fifth revolute joint 223.

Moreover, the operation grip 11 is held by the fifth link member 225 (224A) in such a manner that the rotation axis of the operation grip 11 passes through a point where the rotation axes of the fourth revolute joint 221 and the fifth revolute joint 223 orthogonally intersect each other. Accordingly, the operation grip 11 can be inclined in any direction around the aforementioned point and also can rotate around the longitudinal direction of the operation grip 11. Thus, the operation grip 11 has three degrees of freedom.

It should be noted, as shown in FIG. 3, that the fifth link member 224 of the state variable support mechanism 2, at its lower position, holds an encoder 54 which is one of the grip displacement amount detection means 5. The encoder 54 detects a rotation angle of the operation grip 11 rotated by the sixth revolute joint 225 against the fifth link member 224.

Here, as shown in FIG. 3, the fifth link member 224 of the first operation input means 2 holds the lower end of the operation grip 11. Moreover, the fifth link member 224A of the second operation input means 2A holds a portion of the operation grip 11 upper than the lower end.

The remaining portion of the operation grip 11 (about 70% of its length) serves as a grip section 111 to be grasped by the operator.

It should be noted that the reference symbol 112 denotes a depression switch for entering a predetermined instruction.

Next, explanation will be given on the drive force generation means 6 and the grip displacement amount detection means 5 provided together with the operation input means 2 and 2A.

Each of the operation input means 2 and 2A includes first drive force generation means, second drive force generation means, and third drive force generation means. The first and the second operation input means 2 and 2A have identical configurations and explanation will be given only on the first operation input means.

The first drive force generation means applies a rotation torque to the first link member 212 which can be rotated against the top plate 123 by the first revolute joint 211. The first drive force generation means 61 includes: a drive motor fixed to the top plate 123 of the base 12; a main pulley 612 arranged on the drive shaft of the drive motor 611; a follower pulley 613 fixed to the upper end of the rotary shaft 211a of the first revolute joint 211; and a transmission belt 614 for transmitting the torque of the main pulley 612 to the follower pulley 613. Since the rotary shaft 211a and the first link member 212 are fixedly connected to each other, the torque output from the drive motor 611 is transmitted via the rotary shaft 211a to the first link member 212.

Moreover, beside the drive motor 611, there is arranged an encoder 51 constituting the grip displacement amount detection means 5, for detecting a rotation amount of the drive shaft of the drive motor 611. That is, a rotation angle displacement proportional to the rotation amount of the first link member generated by manual operation of the operation grip 11 is generated in the drive shaft of the drive motor 611 via the follower pulley 613, the transmission belt 614, and the main pulley 612. This is detected by the encoder 51, so as to calculate the rotation displacement amount of the first link member 212 against the top plate 123.

Figure 7:
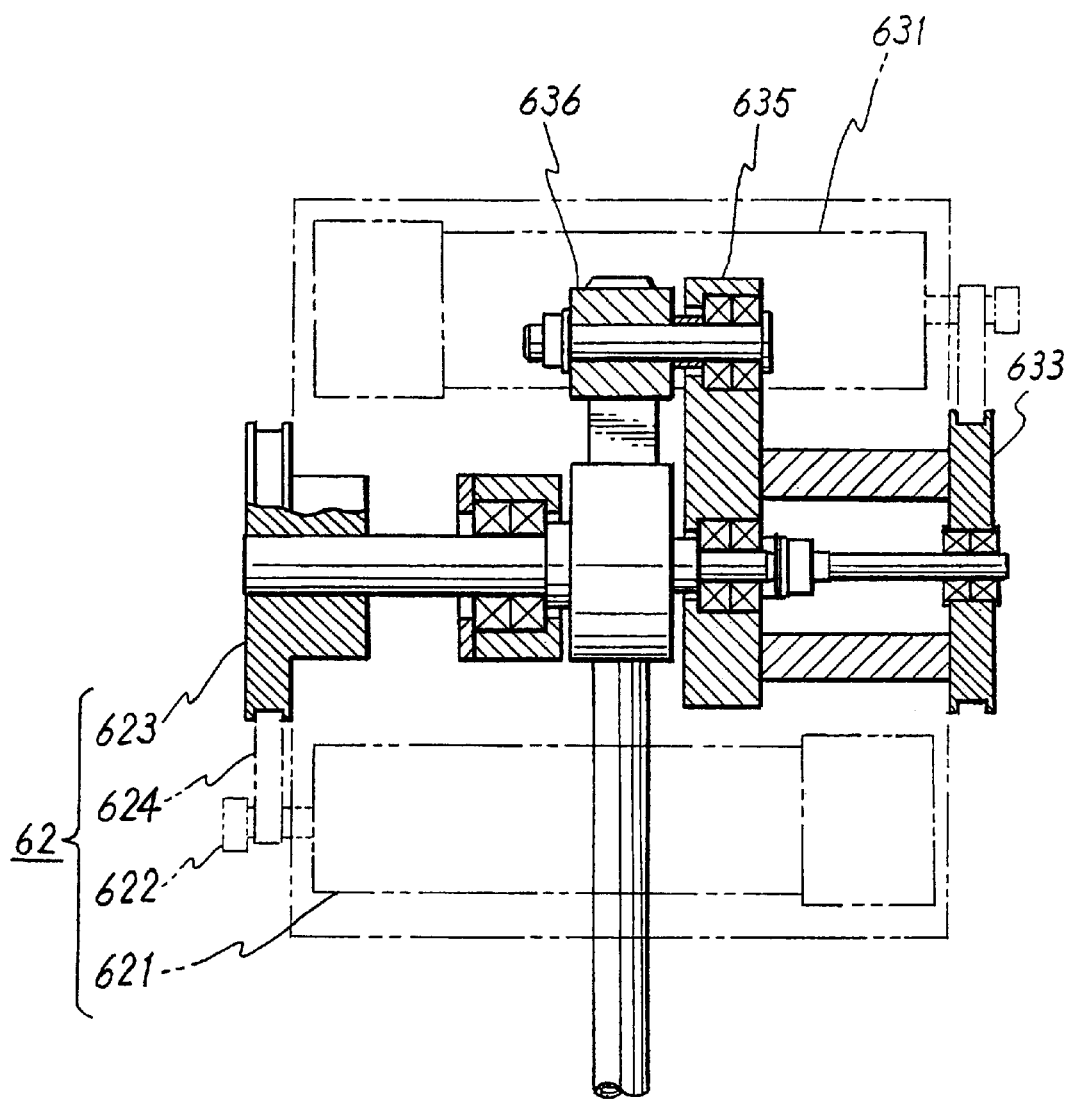
FIG. 7 is a cross sectional view about the line X—X in FIG. 4.

Next, explanation will be given on the second drive force generation means 62 with reference to FIG. 4 and FIG. 7. FIG. 7 is a cross sectional view about the line X—X in FIG. 4. As shown in these figures, the second drive force generation means 62 applies a rotary torque to the second link member 214 which is rotated by the second revolute joint 213 against the first link member 212. The second drive force generation means 62 includes: a drive motor 621 fixed to the first link member 212; a main pulley arranged on the drive shaft of the drive motor 621; a follower pulley 623 fixed at the left end of the rotary shaft 213a of the second revolute joint 213; and a transmission belt 624 for transmitting the torque of the main pulley 622 to the follower pulley 623. Since the rotary shaft 213a and the second link member 214 is fixed to each other, the torque output from the drive motor 621 is applied via the rotary shaft 213a to the second link member 214.

Moreover, beside the drive motor 621, there is arranged an encoder 52 constituting the grip displacement amount detection means 5 for detecting a rotation amount of the drive shaft of the drive motor 621. That is a rotation angle displacement proportional to the rotation amount of the second link member 214 generated by manual operation of the operation grip 11 is generated on the drive shaft of the motor 621 via the follower pulley 623, the transmission belt 624, and the main pulley 622. This is detected by the encoder 52, so as to calculate the rotation angle displacement amount of the second link member against the first link member 212.

Next, explanation will be given on the third drive force generation means 63 with reference to FIGS. 3, 4, 7, 8, and 9. The third drive force generation means 63 applies a rotary torque to the third link member 216 which is rotated by the third revolute joint 215 against the second link member 214.

Figure 4:
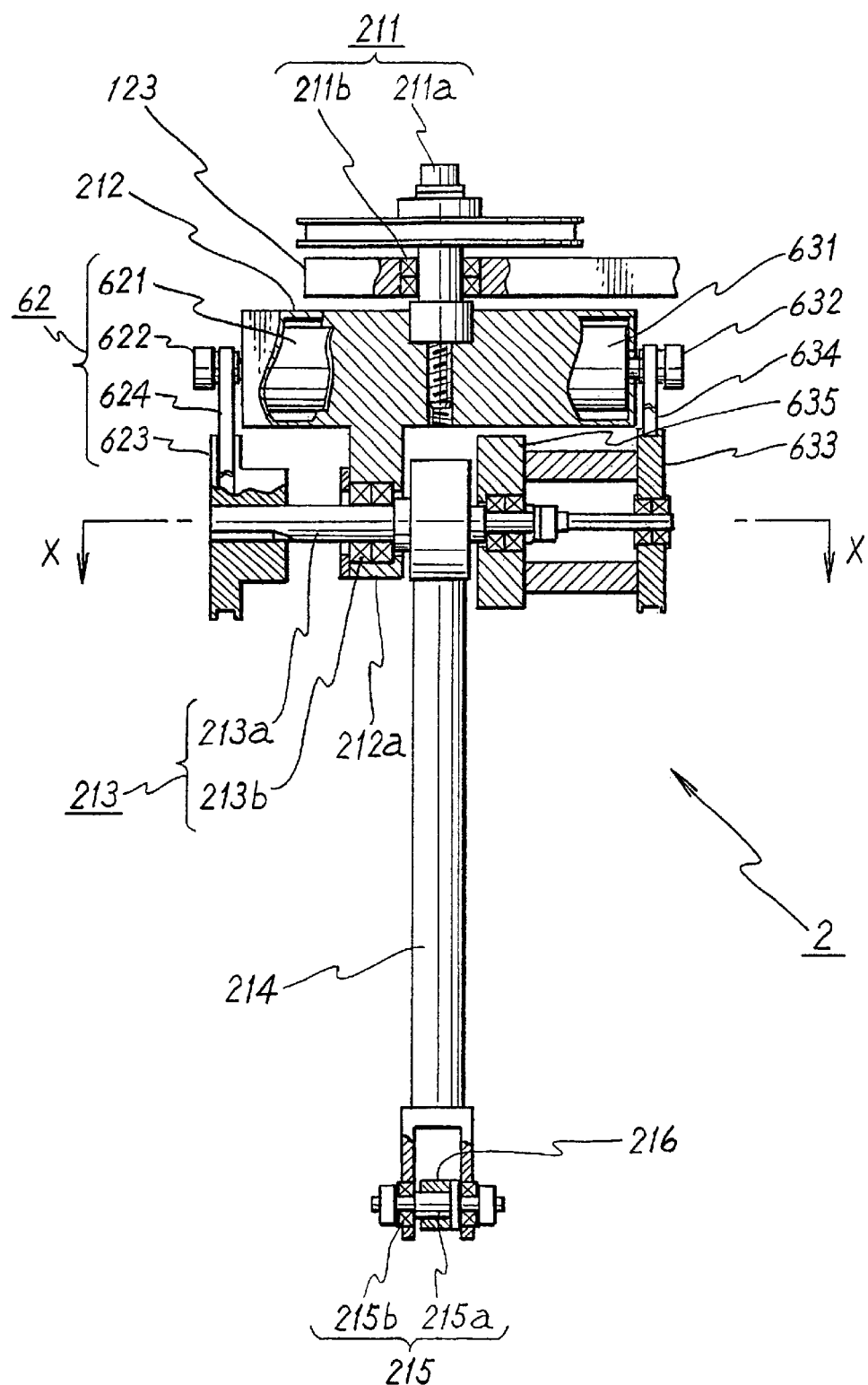
FIG. 4 is a front view of the operation input means shown in FIG. 3, partially omitted and exploded.

As shown in FIG. 4 and FIG. 7, the third drive force generation means 63 includes: a drive motor 631 fixed to the first link member 212; a main pulley 632 mounted on the drive shaft of the drive motor 631; a follower pulley 633 arranged to be rotatable at the right end (in FIG. 4) of the rotary shaft 213a of the second revolute joint 213; a transmission belt 634 for transmitting the torque from the main pulley to the follower pulley; a cam member 635 arranged to be rotatable at the center of the rotary shaft 213*a* and interlocked with the follower pulley 633; and a transmission member 636 for transmitting the rotary operation of the cam member 635 to the second end (not having the state variable support mechanism 22) of the third link member 216.

Figure 8B:
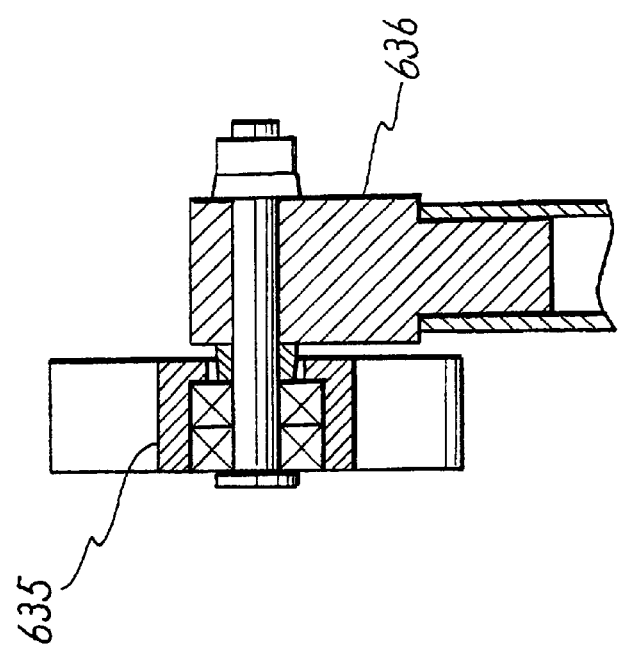
FIG. 8(B) is a cross sectional view about the line Y—Y in FIG. 8(A).
Figure 8A:
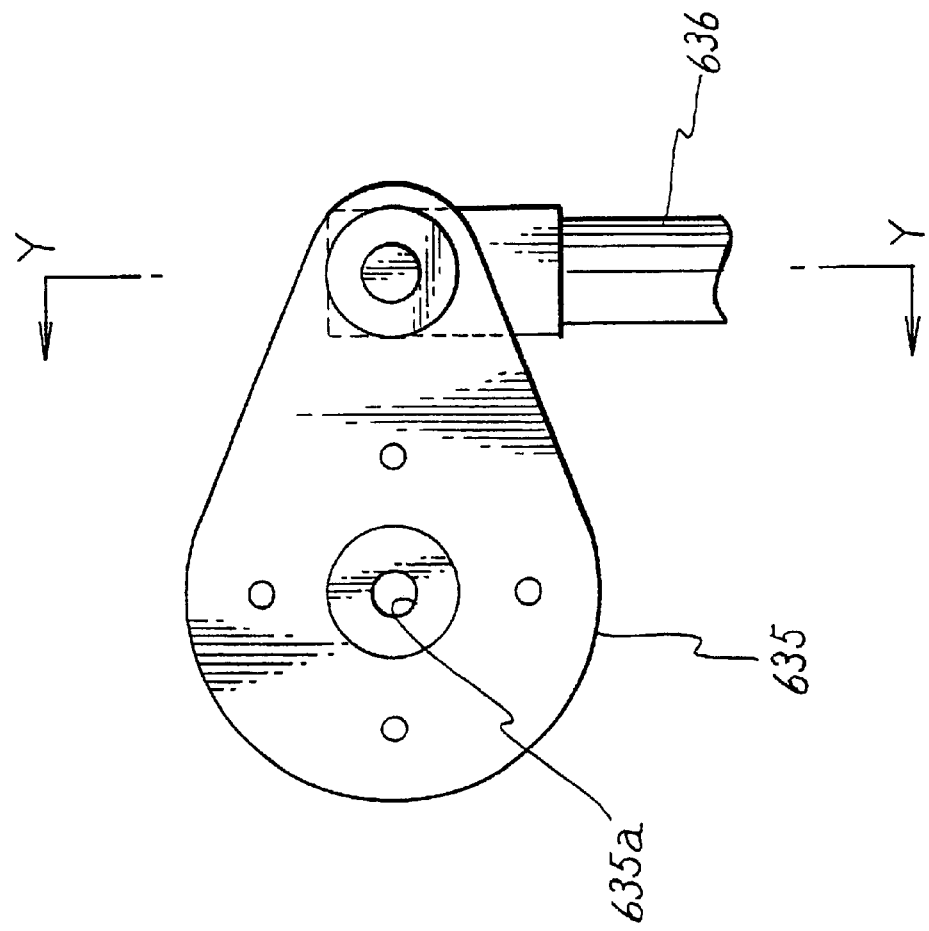
FIG. 8(A) is a front view.

FIG. 8 shows the cam member 635 and a part of the transmission member 636. FIG. 8 (A) shows the cam member 635 viewed from the right side in FIG. 4; and FIG. 8 (B) is a cross sectional view about the line Y—Y in FIG. 8 (A). The cam member 635 has at its center an insert hole 635*a* through which the rotary shaft 213*a* is inserted via a bearing. At a predetermined from this insert hole, one end (first end) of the transmission member 636 is connected to the cam member 635 so as to be rotatable around an axis parallel to the rotary shaft 213*a*.

The other end (second end) of the transmission member 636 is connected to the second end of the third link member 216 so as to be rotatable around an axis parallel to the rotary shaft 215*a* of the third revolute joint 215 (see FIG. 3). The distance between the rotary shaft 213*a* and the rotation center of the first end of the transmission member 636 in the cam member 635 is set identical to the distance between the rotary shaft 215*a* and the rotation center of the second end of the transmission member 636 in the third link member 216. Moreover, the transmission member 636 has an identical length as the second link member 214 (more specifically, a distance between the rotation center axes at the both ends of the members).

Accordingly, rotation angle of the cam member 635 is always identical to the rotation angle of the link member 216 against the second link member 214.

With this configuration, during drive of the drive motor 631 of the third drive force generation means 63, the cam member 635 can be provided with rotation torque regardless of the rotation of the center axis 213*a* of the second revolute joint 213, and it is possible to transmit the rotation torque for the second link member 214, to the third link member 216 via the transmission member 636.

Figure 9:
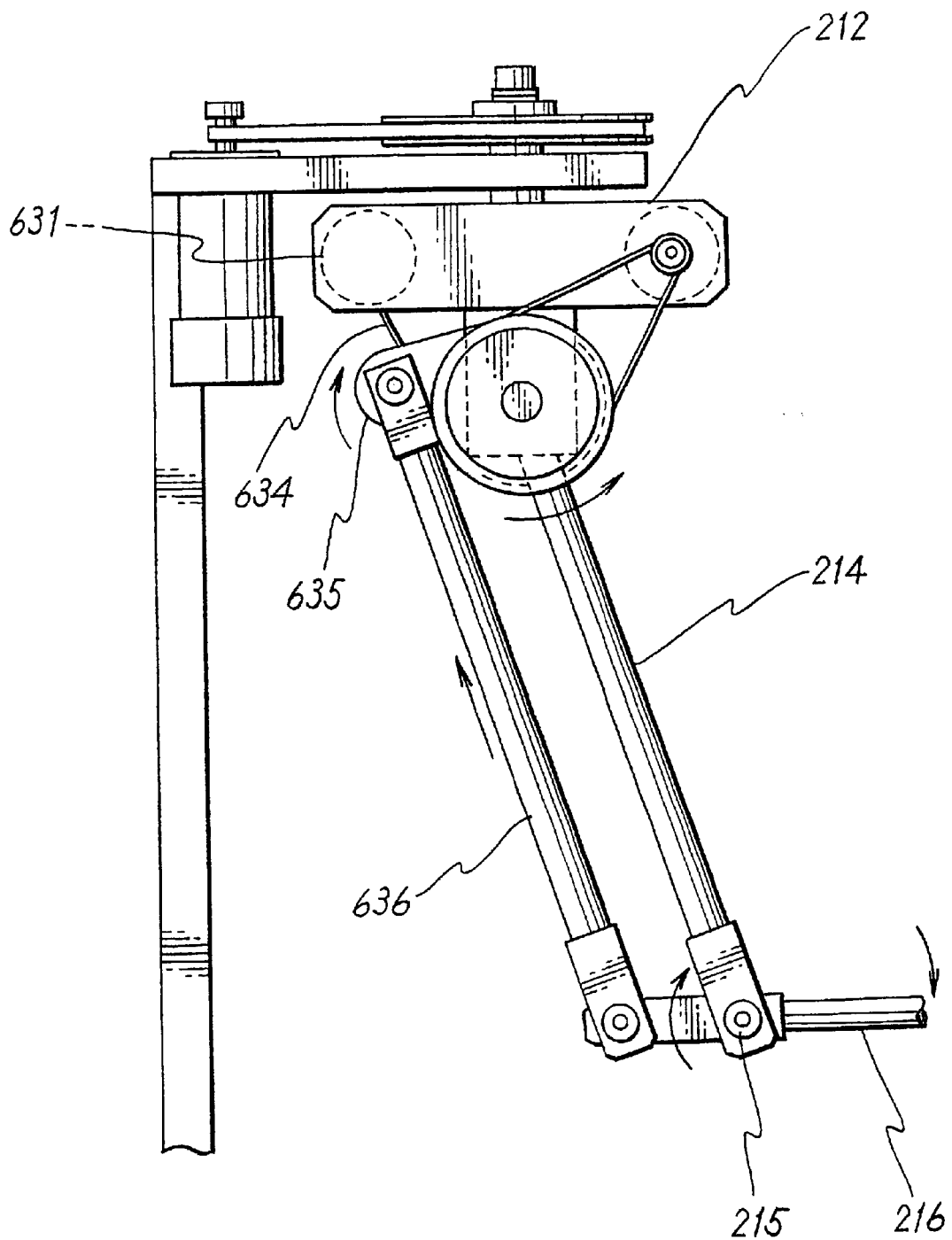
FIG. 9 explains operation of the second and the third drive force generation means shown in FIG. 3.

Moreover, beside the drive motor 631, there is arranged an encoder constituting the grip displacement amount detection means 5 for detecting a rotation amount of the drive motor 631. For example, as shown in FIG. 9, when manual operation of the operation grip 11 rotates the third link member 216 against the second link member 214, the transmission member 636 rotates the cam member 635 with an angle equal to the rotation angle of the third link member 216, and a rotation angle displacement proportional to the rotation angle of the cam member 635 is generated on the drive shaft of the drive motor 631 via the follower pulley 633, the transmission belt 634, and the main pulley 632. This is detected by the encoder 53 to calculate the rotation angle displacement of the third link member 216 against the second link member 214.

Here, the encoders arranged on the revolute joints of the operation input means 2 outputs a corresponding number of pulses proportional to the rotation angle, which pulses are counted by a corresponding counter.

Moreover, each of the drive motors arranged on the revolute joings of the operation input means 2 includes: a D/A converter for converging an instruction signal from the control means 3, to an analog signal; an amplifier for amplifying the signal from this D/A converter; and reduction gears for adjusting the rpm of the drive motor.

Figure 10:
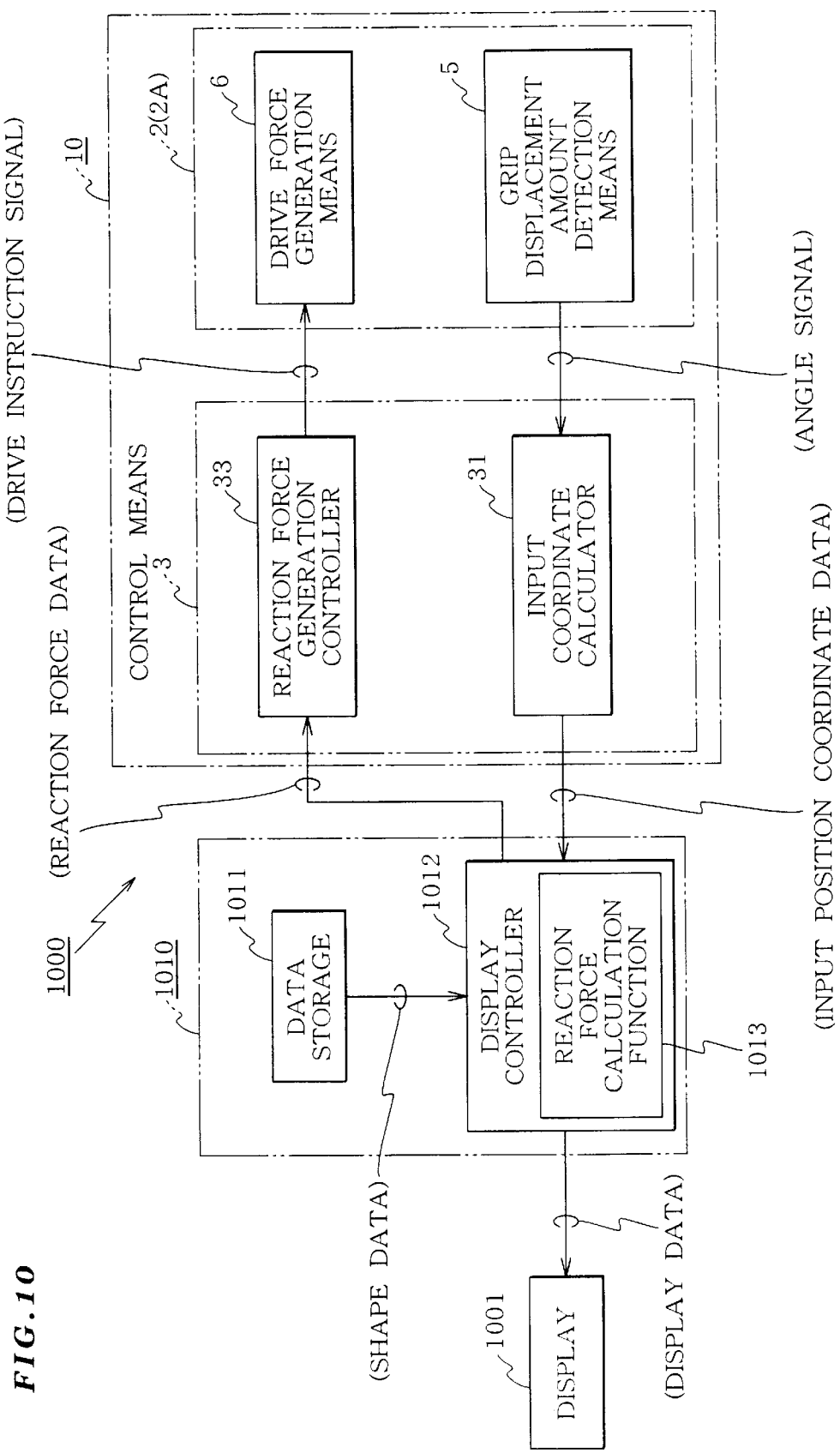
FIG. 10 is a block diagram showing the three-dimensional input system shown in FIG. 1.

Next, explanation will be given on the control means 3. As shown in FIG. 10, the control means includes: an input coordinate calculator 31 which calculates a input position coordinate data of the operation grip 11 according to the detected angle signal from the encoders 51, 52, 53 of the operation input means 2 and outputs the calculated data to the CPU 1010; and a reaction force generation controller 33 which receives a reaction force data corresponding to the input position coordinate data from the CPU 1010 and outputs a drive instruction signal according to this reaction force data, to the drive motors 611, 621, and 631.

On the other hand, the CPU 1010, as shown in FIG. 10, includes: a shape data storage block 1011 for storing a shape data of a predefined virtual object 1051 and a virtual pointer 1050; and a display controller 1012 for setting a virtual space, positioning in this virtual space the virtual object 1051 and the virtual pointer based on the shape data, and controlling output to a display 1001.

The shape data stored in the shape data storage block 1011 may be any if it is possible to calculate a tangent plane of the virtual object predefined. The present embodiment uses a shape definition by a parametric function and a shape definition by a distribution function.

The display controller 1012 has a reaction force calculation function 1013 for positioning the virtual pointer 1050 in the virtual space according to the input position coordinate data from the input coordinate calculation block 31 of the three-dimensional manipulator 10, and calculating the magnitude and direction of virtual reaction force applied from an object when the virtual object 1051 is brought into contact with the virtual pointer 1050. The reaction force data calculated by this reaction force calculation function 1013 is output to the reaction force generation controller 33 of the three-dimensional manipulator 10.

The reaction force generation controller 33 calculates an output torque for each of the drive motors 611, 621, 631 of the operation input means 2 from the reaction force data and outputs a drive instruction signal according to the calculated torque.

Firstly, the input coordinate calculator 31 calculates the coordinates of the tip end position of the operation input means 2, 2A according to the detected angle of the encoders 51, 52, 53 and the length of the link member. Thus, two points of the operation grip 11 are specified, which enables to specify the input position coordinate data and the state data of the operation grip 11.

The input position coordinate data and the state data of the operation grip 11 are output to the display controller 1012 of the CPU 1010. In the display controller 1012, the current position coordinates of the operation grip 11 according to the input position coordinate data are mapped onto a coordinate system of the virtual space. The mapped current position coordinates are used as the tip end position coordinates of the virtual pointer to position the virtual pointer 1050 in the virtual space and outputs the coordinates to the display 1001.

Moreover, in the display controller 1012, the reaction force calculation function 1013 calculates a reaction force data according to the relationship between the tip end coordinates of the virtual pointer 1050 and the surface position coordinates of the virtual object 1051. The reaction force data includes reaction forces in the x, y, and z directions and moment around the respective axes and is output to the three-dimensional input manipulator 10.

The reaction force generation controller 33 calculates output torque of each of the drive motors of the drive force generation means 61, 62, 63 mounted on the operation input means 2 and 2A. The reaction force generation controller 33 outputs a drive instruction signal to the drive motors according to the drive torque.

Next, explanation will be given on the operation of the three-dimensional input system 1000 with reference to FIG.

Figure 11:
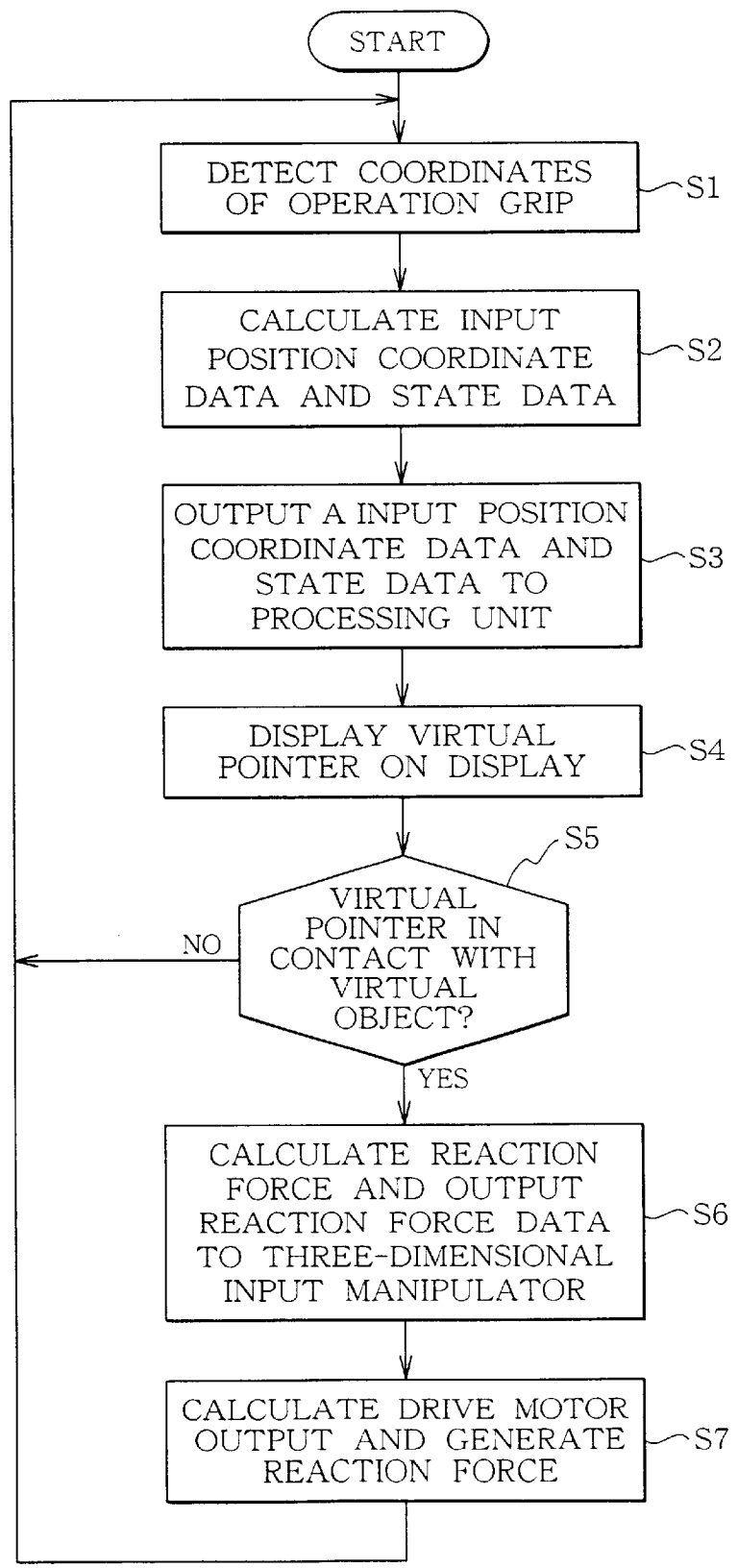
FIG. 11 is a flowchart showing operation of the first embodiment.

10 and FIG. 11. FIG. 11 is a flowchart of the operation of the three-dimensional input system 1000.

The operator grasps the operation grip 11 to displace the operation grip 11, here each of the first and the second operation input means 2 and 2A has six degrees of freedom and accordingly, the operation grip 11 can be displaced in six degrees of freedom. The grip can be moved in the three-dimensional space, inclined in any direction, and rotated around the longitudinal direction of the operation grip 11.

When the operation grip 11 is displaced, the encoders 51, 52, 53, 54 arranged on the input position support mechanism 21 detect respective angle displacements (step 1).

According to the angle displacement detected, the input coordinate calculator 31 calculates the input position coordinate data and the state data of the operation grip 11 (step S2). The calculation result is output to the display controller of the CPU 1010 (step S3).

In the display controller 1012, the virtual pointer 1050 is located at a position corresponding to the input position coordinate data in the virtual space of the display 1001 (step S4). The reaction force calculation function 1013 determines whether the virtual pointer 1050 is in contact with the virtual object 1051 (step S5).

If it is determined that the virtual pointer 1050 is not in contact with the virtual object 1051, the displacement of the operation grip 11 is continued and the steps S1 to S4 are repeated.

On the other hand if it is determined that the virtual pointer 1050 is in contact with the virtual object 1051, the reaction force is calculated. The reaction force calculated is output to the reaction force generation controller 33 of the three-dimensional input manipulator 10 (step S6).

The reaction force generation controller 33 calculates the drive torque of each of the drive motors 611, 612, 613 of the operation input means 2 and 2A and controls the drive motors 611, 612, 613 so as to generate an output based on the drive torque (step S7). This enables the operator to feel the reaction force from the virtual object when the virtual pointer 11050 is in contact with the virtual object 1051.

The operator further displaces the operation grip 11 and input position coordinates are detected to repeat the operation of Steps S1 to S7.

In this embodiment, more than half of the length of the operation grip 11 including one end serves as a grip portion 111 and the operation input means 2 and 2A support at two points in the vicinity of the other end of the operation grip 11.

Thus, a distance between the two points supporting the operation grip 11 by the operation input means 2 and 2A can be smaller than the conventional operation grip which is supported at its two ends. Even if the operation range of the operation grip 11 is specified identical to the conventional one, the operation input means 2 and 2A can be made smaller and lighter. Accordingly, it is possible to reduce the size and weight of the entire three-dimensional input manipulator.

Moreover, when the base 12 is placed on a horizontal plane, the operation input means 2 and 2A are vertically supported by the rotary shaft 211a of the first revolute joint 211. The tensile stress generated on the rotary shaft 211a connecting the input operation means 2 and 2A to the top plate 123 of the base 12 is smaller than the bending stress applied in the conventional apparatus. This reduces the load on the rotary shaft 211a and prolongs the apparatus service life.

Furthermore, with the operation input means 2 and 2A and the drive motors 611, 621, 631, the operator can feel the reaction force according to the reaction force data. The three-dimensional input manipulator 10 is mounted on the three-dimensional input system 1000, in which the operator can receive an accurate pseudo-reaction force feedback and feel more real pseudo-feeling.

It should be noted that in this embodiment, the control means 3 of the three-dimensional input manipulator 10 may be involved in the CPU 1010 as an upper node apparatus. Alternatively, the control means 3 of the three-dimensional input manipulator 10 may provide the function of the CPU 1010.

Although FIG. 1 shows a particular virtual object and a pointer, the present embodiment is not to be limited to such object and pointer. For example, assuming a simulation of a human body surgery, the pointer may be a knife and the virtual object, an organ to be subjected to surgery.

Embodiment 2

Description will now be directed to a second embodiment of the present invention with reference to FIG. 12 to FIG. 17.

In this second embodiment, a three-dimensional input manipulator 10B is mounted on a three-dimensional inpu system 1000B. Like components as in the aforementioned three-dimensional manipulator 10 and the three-dimensional input system 1000 are denoted by like reference symbols and their explanation is omitted.

Figure 12:
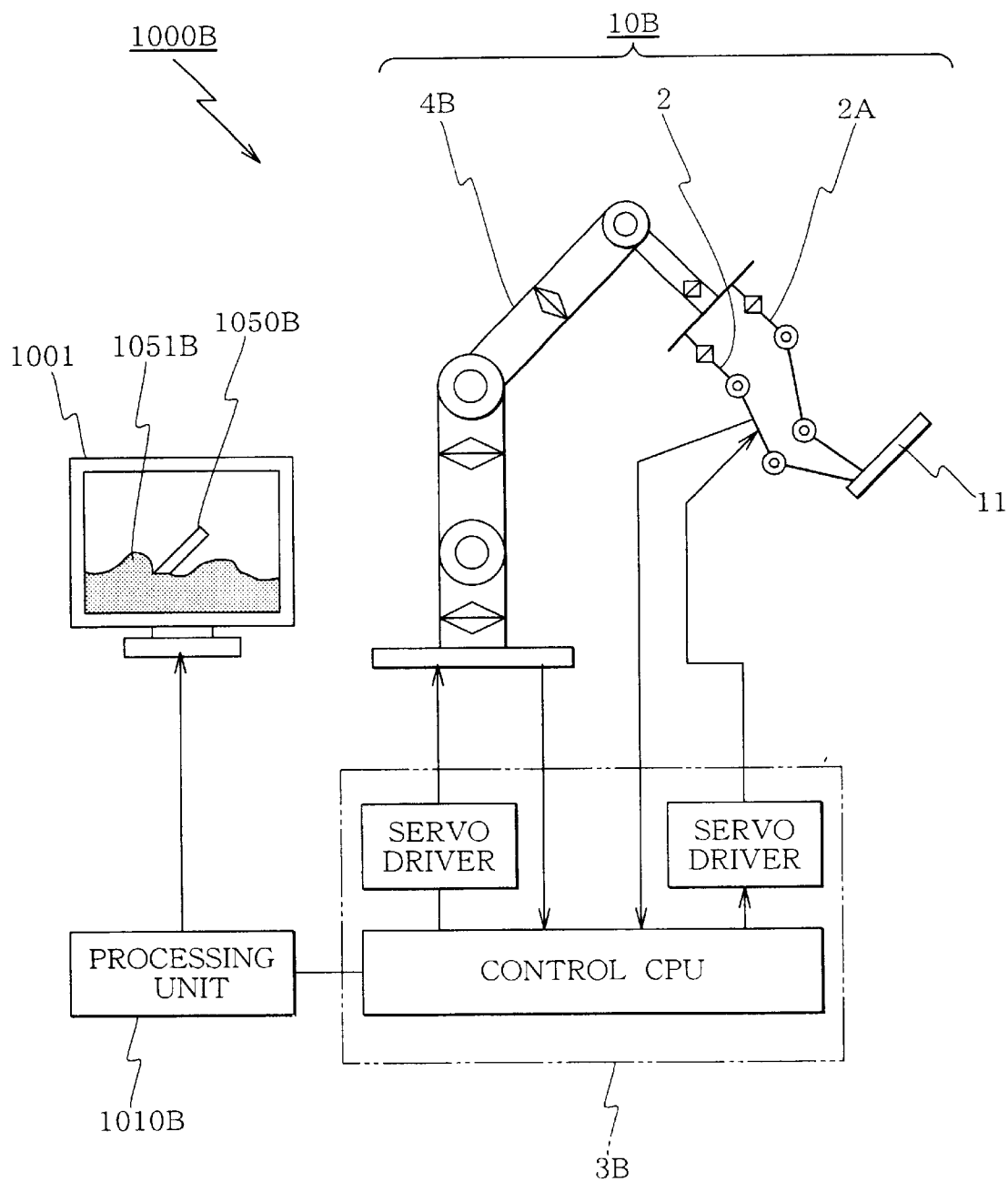
FIG. 12 schematically shows a second embodiment of the present invention.

As shown in FIG. 12, the three-dimensional input system 1000B includes: a three-dimensional input manipulator 10B; a CPU 1010B as an upper node apparatus of the three-dimensional input manipulator 10B, and a display 1001 for showing a video data according to the output data from the CPU 1010B.

The three-dimensional input manipulator 10B, as shown in FIG. 12 (and FIG. 2), includes: a single operation grip 11; first and second operation input means 2, 2A (FIG. 12 shows a smaller number of revolute joints than the actual number); grip displacement amount detection means 5 (see FIG. 15); drive force generation means 6; a displacement urging mechanism 4B for holding the operation input means 2, 2A in a state enabling to realize seven degrees of freedom and displace the operation input means 2, 2A in a three-dimensional space; holding position displacement amount detection means (not depicted) for detecting a state change amount of the operation input means 2, 2A from the displacement urging mechanism 4B; and control means 3B for controlling the operation of the respective components.

Figure 13:
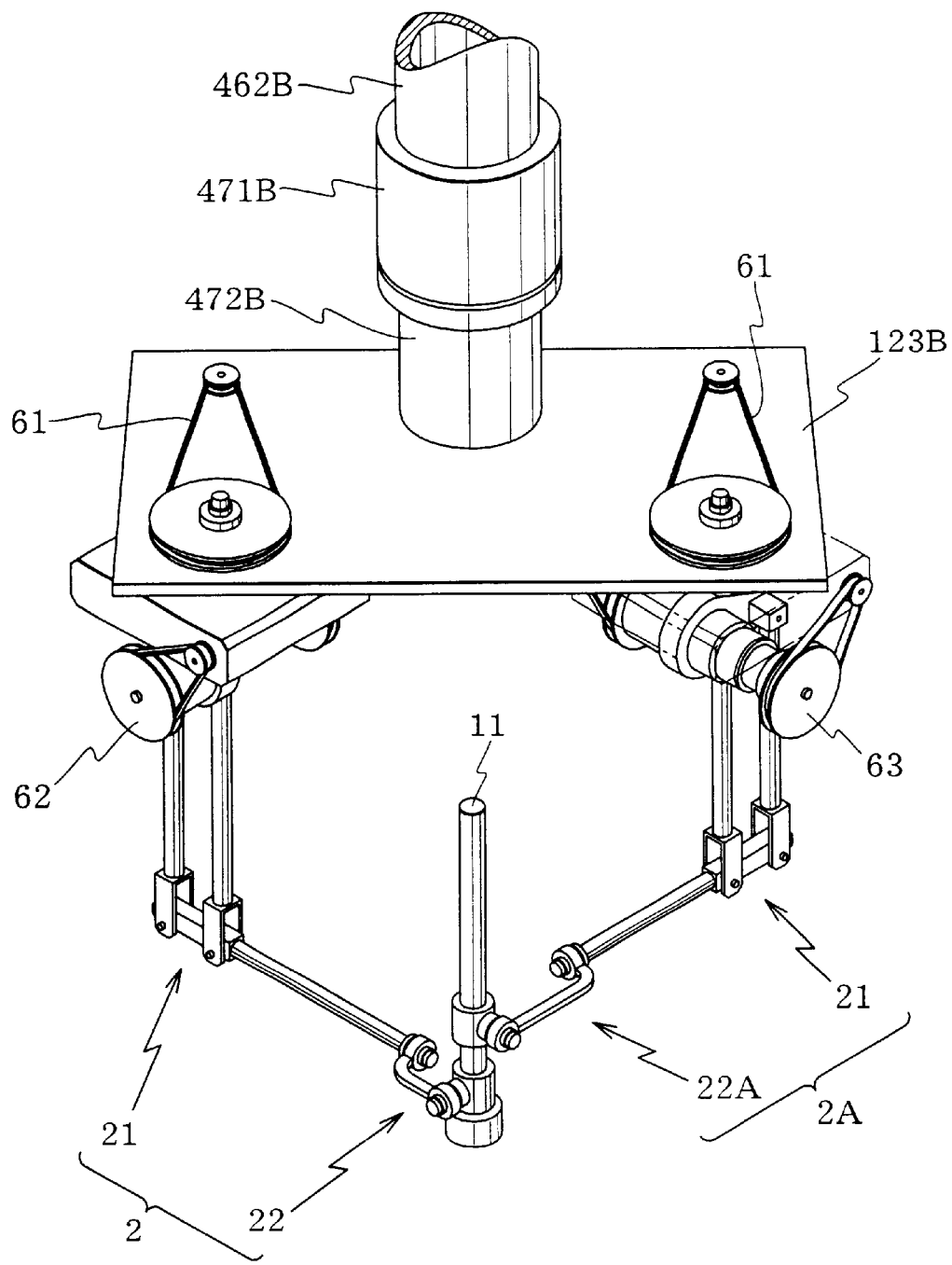
FIG. 13 is a perspective view of first and second operation input means disclosed in FIG. 12.

Unlike the aforementioned stand-alone type base, the top plate 123B is fixed to the support end of the displacement urging mechanism 4B as shown in FIG. 13. The displacement urging mechanism 4B supports the operation input means 2 and 2A through the top plate 123B.

This displacement urging mechanism 4B, like the operation input means 2, includes a plurality of link members connected through revolute joints, realizing a plurality of degrees of freedom of the operation input means 2.

Figure 14:
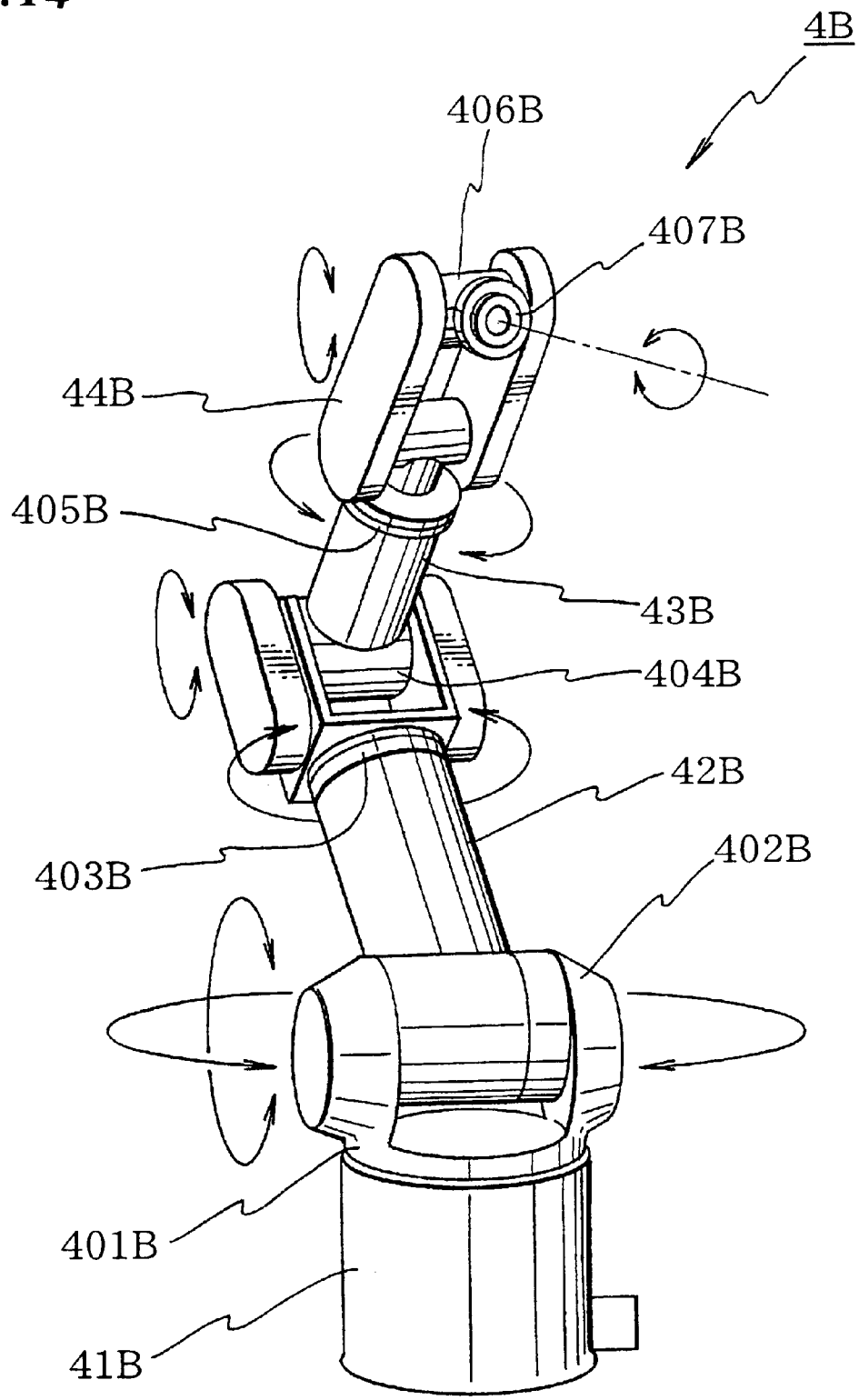
FIG. 14 is a perspective view of a displacement urging mechanism disclosed in FIG. 12.

As shown in FIG. 14, the displacement urging mechanism 4B is placed on a horizontal plane and includes: a base 41B for supporting the entire mechanism; a first link member 42B connected via a first revolute joint 401B having a vertical axis and a second revolute joint 402B having a horizontal axis; a second link member 43B connected to the tip of the first link member 42B via a third revolute joint 403B having an axis at the center of the first link member 42B and a fourth revolute joint 404B having an axis vertical to the first link member 42B; a third link member 44B connected to the tip of the second link member 43B via a fifth revolute joint 405B having an axis at the center of the second link member 43B; a sixth revolute joint 406B arranged at the tip of the third link member 44B and having an axis vertical to the third link member 44B; and a seventh revolute joint 407B arranged at the tip of the third link member 44B and having an axis vertical to the rotary shaft of the sixth revolute joint 406B.

Furthermore, the seventh revolute joint 407B supports the first and the second operation input means 2, 2A through the top plate 123B. Here, the first revolute joint 401B, the third revolute joint 403B, the fifth revolute joint 405B, and the seventh revolute joint 407B are joints where one member can be rotated 360 degrees against the other member. The second revolute joint 402B, the fourth revolute joint 404B, and the sixth revolute joint 406B are joints where one member can be rotated within a certain angle against the other member.

Furthermore, each of the revolute joints 401B to 407B has an encoder (not depicted) as holding position displacement detection means for detecting the angle of rotation and a drive motor (not depicted) for rotating the joint.

The displacement urging mechanism 4B having the aforementioned configuration can move the first and the second operation input means within an entire space of a hemisphere around the base 41B and having a radius equal to the total length of the first, the second, and the third link members 42B, 43B, and 44B.

Each of the encoders arranged in the displacement urging mechanism 4B and in the operation input means 2 issues a pulse the number of times that is proportional to the rotation between the link members. Each of the encoders has a counter (not depicted) for counting the pulses and outputs the counting result.

Moreover, each of the drive motors arranged for the joints of the displacement urging mechanism 4B and the operation input means includes: a D/A converter (not depicted) for converting an operation instruction signal or drive instruction signal from the control means 3B into an analog signal; a current amplifier (not depicted) for amplifying the signal from the D/A converter; and reduction gears (not depicted) for adjusting the rpm of the drive motor.

Next, explanation will be given on the control means 3B with reference to FIG. 15. The control means includes a CPU, ROM, and A/C converter and has a program for performing operation control which will be detailed later.

Figure 15:
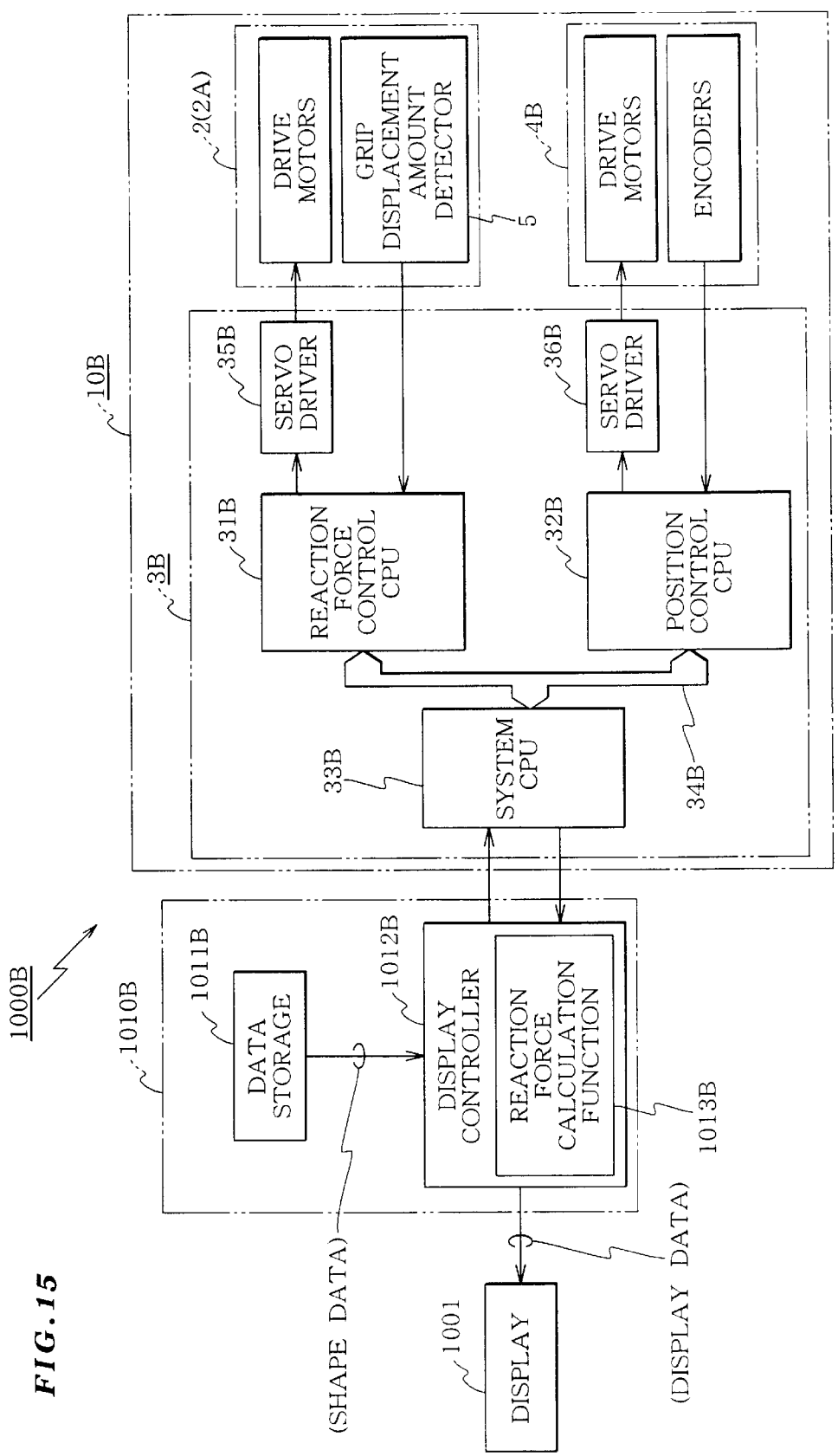
FIG. 15 is a block diagram of a three-dimensional input system of FIG. 12.

As shown in FIG. 15, the control means 3B includes: a reaction force control CPU 31B for performing operation control of the first and the second operation input means 2, 2A; a position control CPU 32B for performing operation control of the displacement urging mechanism 4B; and a system CPU 33B connected to a processing unit 1010B. The CPU's 31B, 32B, and 33B share a data on the VME bus 34B.

The reaction force control CPU 31B serves as an input coordinate calculator for calculating an input position coordinate data and a state data of the operation grip 11 according to angle signals detected by the encoders 51, 52, 53, 54 of the first and the second operation input means and the encoders of the displacement urging mechanism 4B and outputting the calculation result to the processing unit 1010B (see FIG. 3 and FIG. 5).

That is, it is possible to calculate the position coordinates of the two support positions of the operation grip 11 from the outputs from the encoders 51, 52, 53 provided for the operation input means 2, 2A and the respective link lengths. These two point positions enable to identify an input position coordinate data of a predetermined point on the operation grip 11 (for example, the tip end of the operation grip 11).

Moreover, the two support point positions of the operation grip 11 enable to identify inclination of the operation grip 11.

Moreover, if the operation grip 11 has been rotated around the longitudinal direction of the operation grip 11, the encoder 54 outputs a signal corresponding to the rotation angle. Thus, the rotation angle and inclination of the operation grip 11 can be identified as the state data.

The system CPU 33B outputs the aforementioned input position coordinate data and the state data to the processing unit 1010B and receives a reaction force data calculated according to these data items.

The reaction force control CPU 31B also functions as a reaction force generation controller for outputting to a servo driver 35B a drive instruction signal corresponding to the reaction force data received in the system CPU 33B. That is, depending on the direction and strength of the reaction force based on the reaction force data, output torque values of the drive motors 611, 621, 631 mounted on the operation input means 2, 2A are calculated and output as a drive instruction signal to the servo driver 35B.

The servo driver 35B drives the drive motors 611, 621, 631 with the torque and rotation displacement amount corresponding to the drive instruction signals. This enables the operator to feel a virtual reaction force corresponding to the input position, input state or input direction of the operation grip 11.

On the other hand, the position control CPU 32B functions as a holding position calculator for determining the convey destination of the operation input means 2, 2A according to the input position coordinate data calculated in the reaction force control CPU 31B.

That is, in the position control CPU 32B, the operation range (work area) of the operation grip 11 is a space at a predetermined distance from the operation grip 11. If the operation grip 11 goes out of this space, a new work area is set around the current center of the operation grip 11. The convey destination of the operation input means 2 and 2A is determined according to the distance and direction between the previous work area and the updated work area.

Moreover, the position control CPU 32B also functions as a work area updating block for outputting a drive instruction signal to the servo driver 36B, so as to move the top plate 123B at the end of the displacement urging mechanism 4B. That is, according to the movement direction and distance, the rotation angles of the respective drive motors provided on the displacement urging mechanism 4B are calculated and the calculation results are output as drive instruction signals to the servo driver 36B.

The servo driver 36B drives the respective drive motors according to the rotation angles corresponding to the drive instruction signals.

On the other hand, the processing unit 1010B includes a shape data storage 1011B for storing a shape data of a predefined virtual object 1051B and a virtual pointer 1050B (see FIG. 12) and a display controller 1012B for setting a virtual space and allocating in this virtual space the virtual object 1051B and the virtual pointer 1050B according to the shape data, so as to be displayed on the display 1001.

The shape data stored in the shape data storage 1011B may be any if it is possible to calculate a tangent plane of the predefined virtual object. Here, a shape definition by a parametric function and a shape definition by a distribution function are used.

The display controller 1012B has a reaction force calculation function 1013B for positioning the virtual pointer 1050B in the virtual space according to the input position coordinate data output from the system CPU 33B of the three-dimensional input manipulator 10B and calculating a force and direction of a virtual reaction force from the virtual object 1051 which is brought into contact with the virtual pointer 1050B. The reaction force data calculated by this reaction force calculation function 1013B is, as has been described above, output to the system CPU 33B of the three-dimensional input manipulator 10B.

Figure 16:
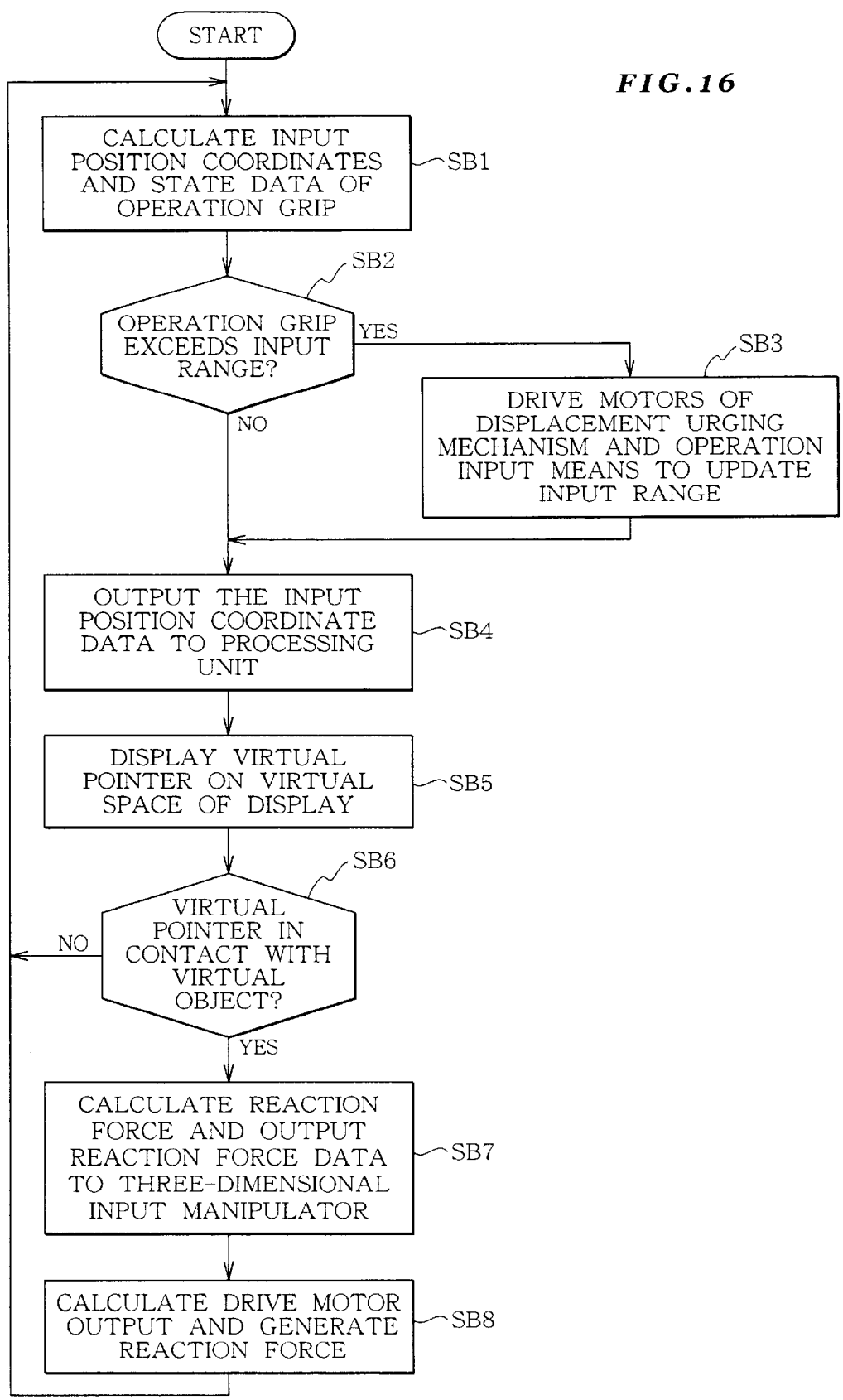
FIG. 16 is a flowchart showing operation of the second embodiment.

Next, explanation will be given on the three-dimensional input system 1000B with reference to FIGS. 12, 15, 16, 17. FIG. 16 is a flowchart showing the operation of the three-dimensional input system 1000B.

Figure 17A:
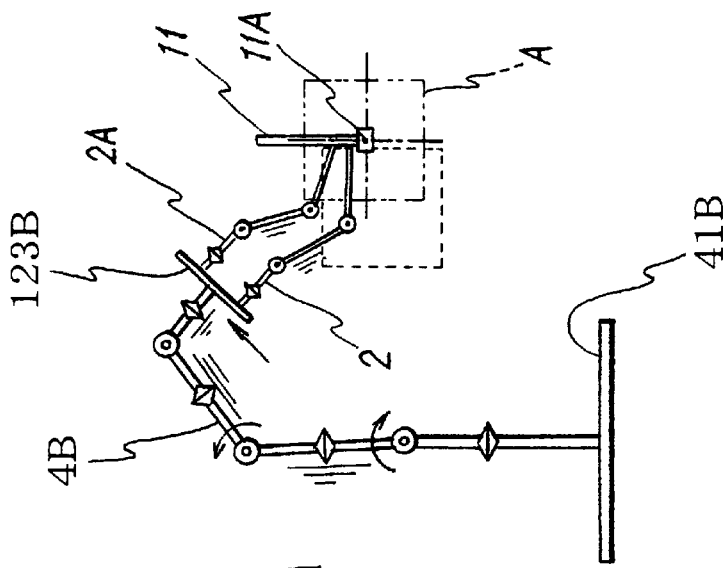
FIG. 17(A) shows the operation grip within the initial work space.

Prior to operation by the operator, the three-dimensional input manipulator 10B has the operation input means 2 and 2A and the displacement urging mechanism 4B set as shown in FIG. 17(A), which will be referred to as a reference state. The reference state is not to be limited to the state of FIG. 17(A), but it is preferable that the reference state be such that the operation grip 11 can be moved to any directions.

When the operation input means 2, 2A and the displacement urging mechanism 4B are at the reference state, the position control CPU 32B sets a spatial coordinate system around the tip end 11a of the operation grip 11, defining a work space A.

The operator starts to displace the operation grip 11 in this state. When the operation grip 11 is displaced by the operator, the encoders 51, 52, 53, 54 of the operation input means 2, 2A output angle signals, and according to these signals, the reaction force control CPU 31B calculate the input position coordinate data and the state data (step SB1).

According to the calculated input position coordinate data and the state data, the position control SPU 32B determines whether the tip end 11a of the operation grip 11 is inside the work space A (step SB2).

If the tip end 11a is determined to be out of the work space A, the position control CPU 32 drives the drive motor of the displacement urging mechanism 4B. Simultaneously with this, the reaction force control CPU 31B drives the drive motors 611, 621, 631 of the operation input means 2, 2A. This will be explained with reference to FIG. 17.

FIG. 17(A) shows a state of the operation grip prior to operation. In this state, the operation input means 2, 2A and the displacement urging mechanism 4B are at the reference state. In this reference state, the tip end 11A of the operation grip 11 is at a definite position against the top plate 123B.

Figure 17B:
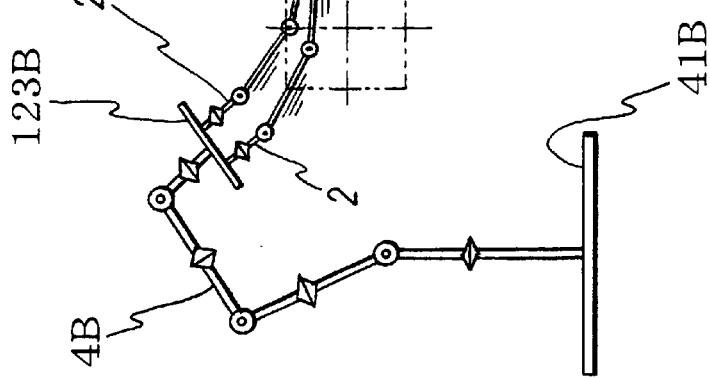
FIG. 17(B) shows the operation grip displaced outside the initial work space.

When the tip end 11A of the operation grip 11 is moved outside the work space A, as shown in FIG. 17(B), according to current position coordinates of the tip end 11A, the respective drive motors of the displacement urging mechanism 4B are driven to move the operation input means 2, 2A.

That is, in the displacement urging mechanism 4B, the drive motors are driven so as to move the top plate 123B into the previous positional relationship with the tip end 11A of the operation grip 11. Simultaneously with this, the drive motors 611, 621, 631 of the operation input means 2, 2A are driven so that the operation input means 2, 2A are at the reference state.

Figure 17C:
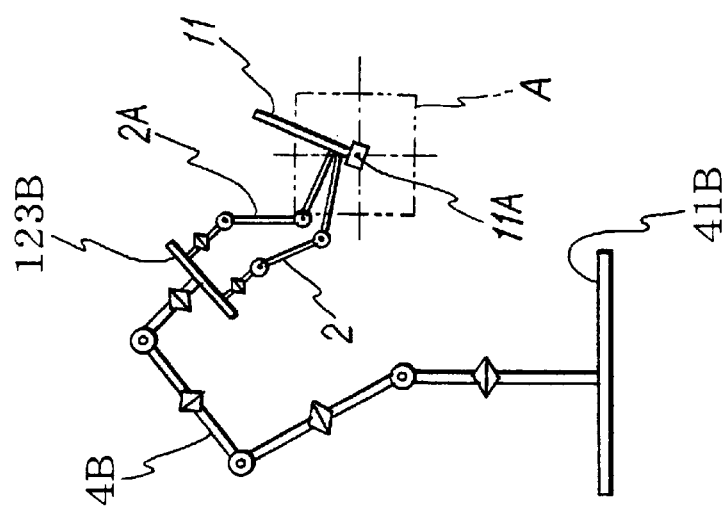
FIG. 17(C) shows the operation input means displaced by the displacement urging mechanism and a new work space set around the operation grip.
Figure 18:
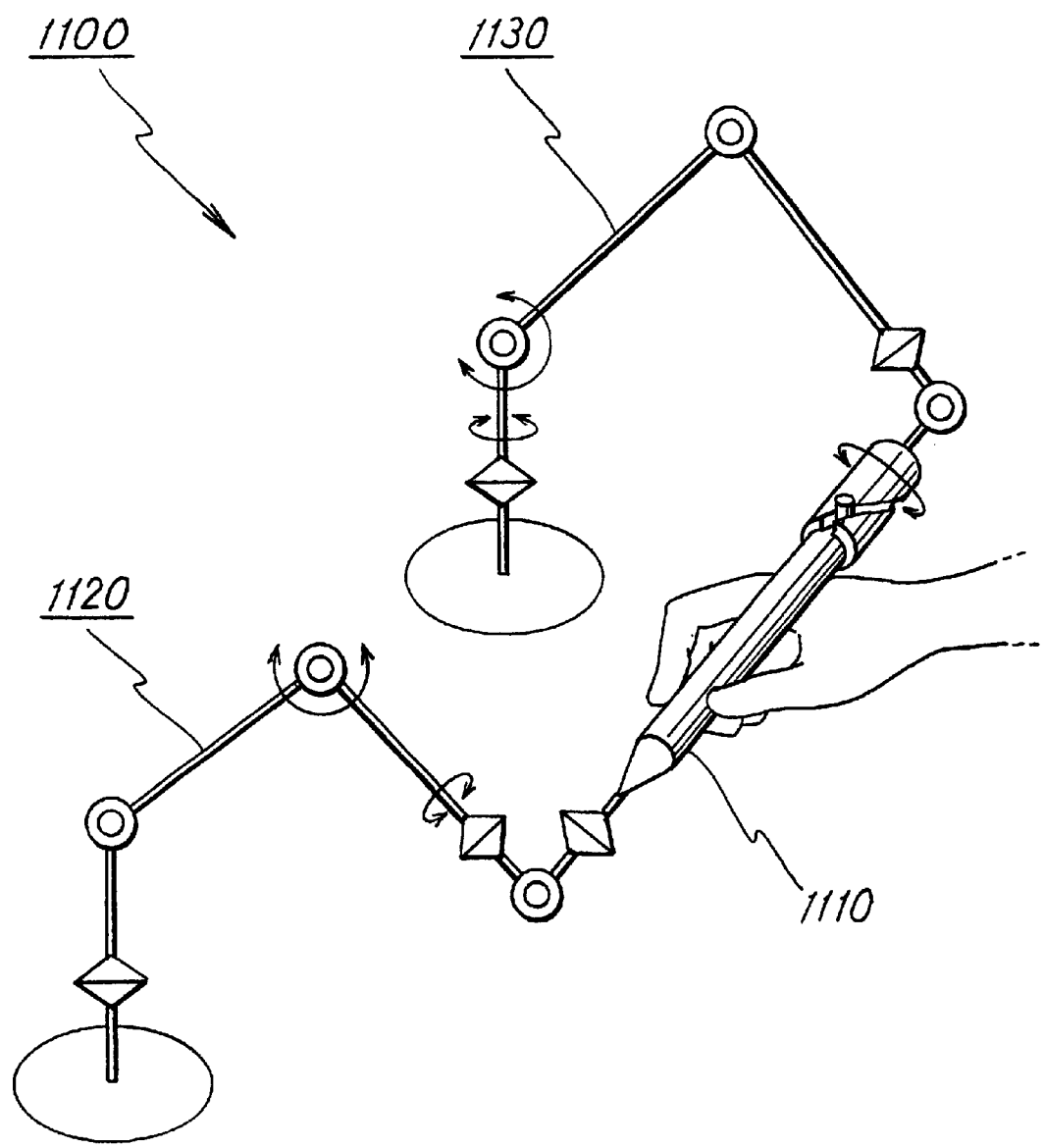
FIG. 18 schematically shows a conventional three-dimensional input manipulator.

Accordingly, even if the displacement urging mechanism 4B has changed its state as shown in FIG. 17(C), the operation input means 2, 2A return to their reference state and the tip end 11A of the operation grip 11 can maintain the current position. In the reaction force control CPU 31B, a new work space A is set around the current position of the tip end 11A of the operation grip 11 (step SB3).

Moreover, the calculated input position coordinate data and the state data are output to the display controller 1012B of the processing unit 1010B (step SB4).

In the display controller 1012B, the tip position of the virtual pointer 1050B is moved to a position corresponding to the input position coordinate data in the virtual space of the display 1001, and the state of the virtual pointer 1050 is changed according to the state data (step SB5). The reaction force calculation function 1013B determines whether the virtual object 1051B is in contact with the tip position of the virtual pointer 1050B (step SB6).

In this step, if it is determined that no contact is present, processing is performed for the input information from the operation grip 11 (step SB1).

On the other hand, if it is determined that a contact is present, reaction force is calculated. The reaction force data calculated is output to the system CPU 33B of the control means 3B.

The reaction force CPU 31B calculates drive torque values of the respective drive motors 611, 621, 631, of the operation input means 2, 2A according to the reaction force data. The servo driver 35B drives the respective drive motors 611, 621, 631 according to the drive torque values calculated (step SB8). Thus, the operator, while observing the display 1001, can feel virtual reaction force from the virtual object when the virtual pointer 1050B is brought into contact with the virtual object 1051B.

The operation grip 11 and the operation input means 2 and 2A are further moved and the input position coordinates are detected to repeat the aforementioned operation (step SB1)

In this second embodiment, the operation input means 2, 2A can be made small and the weight can be reduced in the same way as the three-dimensional input manipulator 10.

Even if the operation grip is moved rapidly by a long distance, it is possible to reduce the inertia caused by the weight of the operation input means 2, 2A.

Furthermore, in the three-dimensional input manipulator 10B, the displacement urging mechanism 4B moves the operation input means 2, 2A according to the operation grip 11. This enlarges the operation range of the operation grip 11. Moreover, even if the operation range is enlarged, the operation input means 2, 2A can follow the operation direction. Accordingly, it is possible to reduce the inertial of the entire apparatus caused during operation. Furthermore, since the operation input means 2, 2A are reduced in weight, it is possible to reduce the inertia during the operation.

With the reduction in inertia, it is possible to improve the operationability of the operation grip 11 and accurately position the operation grip 11 at a destination. Simultaneously with this, it is possible to reduce the load on the arm of the operator, enabling the operator to work on the manipulator 10B for a long time.

Moreover, the operation input means 2, 2A have drive force generation means 61, 62, 63, so that the operator can feed a reaction force according to the reaction force data from the processing unit 1010B. The reaction force is not interfered by the inertia because the inertia of the entire three-dimensional manipulator 10B is effectively reduced.

Thus, the operator can receive an accurate reaction force and feel a real feeling. This enables to operate the three-dimensional manipulator 10B more accurately.

Moreover, the reaction force control CPU 31B of the control means 3B controls to change the state of the operation input means 2, 2A, so that the operation grip 11 will not move when the top plate 123B is displaced by the displacement urging mechanism 4B. Thus, the input operation of the operation grip is not interfered by the movement of the operation input means 2, 2A, enabling to obtain a higher operationability and highly accurate positioning.

Moreover, since the displacement urging mechanism 4B has seven degrees of freedom, it can smoothly convey the operation input means 2, 2A.

It should be noted that in the second embodiment, the control means 3B of the three-dimensional input manipulator may be included in the processing unit 1010B as an upper node apparatus. Alternatively, the control means 3B of the three-dimensional input manipulator may perform the function of the processing unit 1010B.

Description will now be directed to the effects of the embodiment.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application Nos. 11-55728 and 11-55729 (Filed on Mar. $3^{rd}$, 1999) including specification, claims, drawings and summary are incorporated herein by reference in its entirety.

What is claimed is:

1. A three-dimensional input manipulator connected to an upper node apparatus and performing input of coordinates of at least three dimensions, the manipulator comprising:

a single operation grip displaced to an arbitrary position within a definite range of three-dimensional space and performing input of coordinates of a current position of the operation grip;

first operation input means for supporting the operation grip with at least five degrees of freedom for changing a state of the operation grip;

second operation input means for supporting the operation grip with at least six degrees of freedom for changing a state of the operation grip;

grip displacement amount detection means for detecting a change of a position and a direction of the operation grip;

wherein the operation grip is formed to have a bar shape having one end serving as a grip portion for applying an external force; and the first operation input means and the second operation input means hold the operation grip at two different positions, at the other end of the operation grip and at a point in the vicinity of the second end.

2. A three-dimensional input manipulator as claimed in claim 1, wherein the grip portion constitutes half or more than half of the longitudinal length of the operation grip.

3. A three-dimensional input manipulator as claimed in claim 1, wherein both of the operation input means hold the operation grip with six degrees of freedom.

4. A three-dimensional input manipulator as claimed in claim 1, wherein each of the operation input means has: an input position support mechanism for supporting the operation grip at an arbitrary position of the three-dimensional space; and a state variable support mechanism for supporting the operation grip in such a manner that a direction of the operation grip can be changed.

5. A three-dimensional input manipulator as claimed in claim 4, wherein each of the input position support mechanisms of the operation input means has three degrees of freedom, and each of the state variable support mechanisms of the operation input means has three degrees of freedom for supporting the operation grip.

6. A three-dimensional input manipulator as claimed in claim 5, wherein the input position support mechanism and the state variable support mechanism of the operation input means have three joints, respectively, and the grip displacement amount detection means includes six sensors for detecting the state change amount of all the joints of the input position support mechanisms.

7. A three-dimensional input manipulator as claimed in claim 6, the operation input means comprising three drive force generation means for applying to the operation grip a drive force corresponding to the output from the upper node apparatus in the direction according to the degree of freedom of each input position support mechanism.

8. A three-dimensional input manipulator as claimed in claim 1, the operation input means comprising a plurality of drive force generation means for applying to the operation grip a drive force corresponding to an output from the upper node apparatus, in a corresponding direction.

9. A three-dimensional manipulator as claimed in claim 1, the manipulator having a base for holding the operation input means, wherein each of the operation input means has one end for supporting the operation grip and the other end having a revolute joint, each of the operation input means is connected to the base via a rotary shaft of the joint at the second end, and the rotary shafts are placed in a vertical direction when the base is placed on a horizontal plane.

10. A three-dimensional input manipulator as claimed in claim 1, wherein each of the operation input means has an identical number of joints to the plurality of degrees of freedom.

11. A three-dimensional input manipulator as claimed in claim 10, wherein in each of the operation input means, each of the revolute joints has a state change amount detection sensor as grip displacement amount detection means.

12. A three-dimensional input manipulator connected to an upper node apparatus and performing input of coordinates of at least three dimensions, the manipulator comprising:

a single operation grip displaced to an arbitrary position within a definite range of three-dimensional space and performing input of coordinates of a current position;

first operation input means for supporting the operation grip with at least five degrees of freedom for changing a state of the operation grip;

second operation input means for supporting the operation grip with at least six degrees of freedom;

grip displacement amount detection means for detecting a change of a position and a direction of the operation grip;

a displacement urging mechanism for holding the two operation input means with a plurality of degrees of freedom and conveying the operation input means in a three-dimensional space;

holding position displacement detection means for detecting a change of a position and direction of the two operation input means from the displacement urging mechanism; and control means for controlling operations of the respective components;

wherein the operation grip is formed to have a bar shape having one end serves as a grip portion for applying an external force;

the first operation input means and the second operation input means hold the operation grip at the other end of the operation grip and at a position in the vicinity of the second end; and the control means includes: an input coordinate calculator for calculating an input position coordinate data and a state data of the operation grip according to the output from the grip displacement amount detection means and the holding position displacement amount detection means; a holding position calculator for calculating the destination of the first and the second operation input means according to the input position coordinate data of the operation grip; and a work space extender for controlling the operation of the displacement urging mechanism to convey the two operation input means to the destination determined.

13. A three-dimensional input manipulator as claimed in claim 12, wherein each of the operation input means has drive force generation means for generating a displacement of the operation grip, and the control means has a function to maintain the position and state of the operation grip when the displacement urging mechanism is operated.

14. A three-dimensional input manipulator as claimed in claim 12, wherein the control means has a reaction force generation controller for receiving a reaction force data corresponding to the input position coordinate data and outputting a drive instruction signal according to the reaction force data, to the drive force generation means.

15. A three-dimensional input manipulator as claimed in claim 12, wherein the displacement urging mechanism holds the two operation input means with at least six degrees of freedom.

* * * * *